(12) United States Patent
Miyasaka et al.

(10) Patent No.: US 12,229,377 B2
(45) Date of Patent: *Feb. 18, 2025

(54) DETECTION DEVICE AND TOUCH-DETECTION DISPLAY DEVICE

(71) Applicant: Japan Display Inc., Tokyo (JP)

(72) Inventors: Koichi Miyasaka, Tokyo (JP); Yoshikatsu Imazeki, Tokyo (JP); Yoichi Kamijo, Tokyo (JP); Shuichi Osawa, Tokyo (JP); Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,848

(22) Filed: Dec. 21, 2023

(65) Prior Publication Data

US 2024/0126395 A1    Apr. 18, 2024

Related U.S. Application Data

(63) Continuation of application No. 17/951,172, filed on Sep. 23, 2022, now Pat. No. 11,893,194, which is a
(Continued)

(30) Foreign Application Priority Data

Mar. 26, 2020   (JP) ................... 2020-056871

(51) Int. Cl.
*G06F 3/044* (2006.01)
*G02F 1/1333* (2006.01)
(Continued)

(52) U.S. Cl.
CPC ........ *G06F 3/0446* (2019.05); *G02F 1/13338* (2013.01); *G02F 1/134309* (2013.01); *G06V 40/1306* (2022.01)

(58) Field of Classification Search
CPC ......... G06F 3/0412; G06F 2203/04103; G06F 2203/04112; G06F 3/041
See application file for complete search history.

(56) References Cited

U.S. PATENT DOCUMENTS

| 10,739,890 B2 * | 8/2020 | Kurasawa | ............ G02B 6/0056 |
| 2014/0139481 A1 * | 5/2014 | Han | ...................... G06F 3/0448 345/174 |

(Continued)

*Primary Examiner* — Van N Chow
(74) *Attorney, Agent, or Firm* — Michael Best & Friedrich LLP

(57) ABSTRACT

According to an aspect, a detection device includes: drive electrodes; detection electrodes; and dummy electrodes in a floating state. The drive electrodes include a first electrode extending in a first direction, and a second electrode disposed at a predetermined interval from the first electrode in a second direction intersecting the first direction. The detection electrodes include a third electrode extending in the second direction. The dummy electrodes include a fourth electrode disposed at a predetermined interval from the third electrode in the first direction. The first electrode includes a first extension part, a second extension part, and a first coupling part. The second electrode includes a third extension part, a fourth extension part, and a second coupling part. The third electrode includes a fifth extension part, a sixth extension part, and a third coupling part. The fourth electrode includes a seventh extension part, and an eighth extension part.

20 Claims, 22 Drawing Sheets

Related U.S. Application Data continuation of application No. PCT/JP2021/011267, filed on Mar. 18, 2021.

(51) Int. Cl.
  *G02F 1/1343*  (2006.01)
  *G06V 40/13*  (2022.01)

(56) References Cited

U.S. PATENT DOCUMENTS

| | | | |
|---|---|---|---|
| 2017/0193275 A1* | 7/2017 | Liu | G06V 40/1306 |
| 2020/0159354 A1* | 5/2020 | Yoshida | G06F 3/0443 |
| 2023/0168771 A1* | 6/2023 | Kim | G06F 3/0418 |
| | | | 345/174 |

* cited by examiner

FIG.17

|  |  | COMPARATIVE EXAMPLE (474 ppi) | COMPARATIVE EXAMPLE (314 ppi) | FIRST EMBODIMENT (314 ppi) | SECOND EMBODIMENT (295 ppi) |
|---|---|---|---|---|---|
| CAPACITANCE | AVERAGE VALUE | 1.74 fF | 2.20 fF | 2.33 fF | 2.36 fF |
|  | VARIANCE | 0.56 fF | 0.78 fF | 0.12 fF | 0.19 fF |
| REFLECTION STRIPE PATTERN | | OBSERVED | OBSERVED | NOT OBSERVED | NOT OBSERVED |

DETECTION DEVICE AND TOUCH-DETECTION DISPLAY DEVICE

CROSS-REFERENCE TO RELATED APPLICATION

The present application is a Continuation application of U.S. patent application Ser. No. 17/951,172 filed on Sep. 23, 2022, which claims priority to Japanese Patent Application No. 2020-056871 filed on Mar. 26, 2020 and International Patent Application No. PCT/JP2021/011267 filed on Mar. 18, 2021, the entire contents of each of which are hereby incorporated by reference.

BACKGROUND

1. Technical Field

What is disclosed herein relates to a detection device and a touch-detection display device.

2. Description of the Related Art

As disclosed in Japanese Patent Application Laid-open Publication No. 2019-065937 (JP-A-2019-065937), it is known that there is a detection device that detects a fingerprint based on change of capacitance between a drive electrode configured to be provided with a drive signal and a detection electrode opposed to the drive electrode.

In simple use of a detection electrode including a bent part as disclosed in JP-A-2019-065937, when external light is incident on the detection device at such an angle that one of two pieces coupled to each other through the bent part strongly reflects light and the other piece more weakly reflects light than the one piece, intensity unevenness of reflected light is visually recognized as a stripe pattern, which provides poor appearance.

For the foregoing reasons, there is a need for a detection device and a touch-detection display device that can reduce generation of a stripe pattern due to intensity unevenness of reflected light.

SUMMARY

According to an aspect, a detection device includes: drive electrodes each of which is configured to be provided with a drive signal; detection electrodes opposed to the drive electrodes and configured to generate capacitance between the detection electrodes and the drive electrodes; and dummy electrodes in a floating state. The drive electrodes include a first electrode extending in a first direction, and a second electrode disposed at a predetermined interval from the first electrode in a second direction intersecting the first direction. The detection electrodes include a third electrode extending in the second direction. The dummy electrodes include a fourth electrode disposed at a predetermined interval from the third electrode in the first direction. The first electrode includes a first extension part extending in a third direction different from the first direction, a second extension part extending in a fourth direction different from the first direction and the third direction, and a first coupling part through which the first extension part and the second extension part are coupled to each other. The second electrode includes a third extension part extending in the fourth direction, a fourth extension part extending in the third direction, and a second coupling part through which the third extension part and the fourth extension part are coupled to each other. The first extension part and the third extension part are arranged in the second direction and opposed to each other. The second extension part and the fourth extension part are arranged in the second direction and opposed to each other. The third electrode includes a fifth extension part extending in a fifth direction different from the second direction, a sixth extension part extending in a sixth direction different from the second direction and the fifth direction, and a third coupling part through which the fifth extension part and the sixth extension part are coupled to each other. The fourth electrode includes a seventh extension part extending in the sixth direction, and an eighth extension part extending in the fifth direction. The fifth extension part and the seventh extension part are arranged in the first direction and opposed to each other. The sixth extension part and the seventh extension part are arranged in the first direction and opposed to each other.

According to an aspect, a detection device includes: drive electrodes each of which is configured to be provided with a drive signal; and detection electrodes opposed to the drive electrodes and configured to generate capacitance between the detection electrodes and the drive electrodes. The drive electrodes include a first electrode extending in a first direction, and a second electrode that is disposed at a predetermined interval from the first electrode in a second direction intersecting the first direction and is line-symmetric to the first electrode about an axis of symmetry along the first direction. The detection electrodes include a third electrode extending in the second direction, and a fourth electrode that is line-symmetric to the third electrode about an axis of symmetry along the second direction. The first electrode includes a first extension part extending in a third direction, a second extension part extending in a fourth direction, and a first coupling part through which the first extension part and the second extension part are coupled to each other. The second electrode includes a third extension part extending in the fourth direction, a fourth extension part extending in the third direction, and a second coupling part through which the third extension part and the fourth extension part are coupled to each other. The third electrode includes a fifth extension part extending in a fifth direction, a sixth extension part extending in a sixth direction, and a third coupling part through which the fifth extension part and the sixth extension part are coupled to each other. The fourth electrode includes a seventh extension part extending in the sixth direction, and an eighth extension part extending in the fifth direction.

According to an aspect, a detection device includes: drive electrodes each of which is configured to be provided with a drive signal; and detection electrodes opposed to the drive electrodes and configured to generate capacitance between the detection electrodes and the drive electrodes. The drive electrodes or the detection electrodes include a first electrode extending in a first direction, and a second electrode that is disposed at a predetermined interval from the first electrode in a second direction intersecting the first direction and is line-symmetric to the first electrode about an axis of symmetry along the first direction. The first electrode includes a first extension part extending in a third direction, a second extension part extending in a fourth direction, and a first coupling part through which the first extension part and the second extension part are coupled to each other. The second electrode includes a third extension part extending in the fourth direction, a fourth extension part extending in the third direction, and a second coupling part through which the third extension part and the fourth extension part are coupled to each other.

According to an aspect, a detection device includes: drive electrodes each of which is provided with a drive signal; and detection electrodes opposed to the drive electrodes and configured to generate capacitance between the detection electrodes and the drive electrodes. Each drive electrode extends in a first direction and includes curved parts that are continuous in an extension direction. The drive electrodes are arranged at equal intervals in a second direction intersecting the first direction. Each detection electrode extends in the second direction and includes curved parts that are continuous in an extension direction. The detection electrodes are arranged at equal intervals in the first direction.

BRIEF DESCRIPTION OF THE DRAWINGS

FIG. 1 is a plan view illustrating a configuration of a display device, which is common to embodiments and the like;

FIG. 3 is a plan view illustrating an exemplary configuration of a fingerprint detection device, which is common to the embodiments and the like;

FIG. 17 is a table listing the average value and variance of capacitance of intersection points and whether a reflection stripe pattern is generated (visually recognized) in each of the first embodiment, the second embodiment, and the comparative example;

DETAILED DESCRIPTION

Aspects (embodiments) of the present invention the following describes in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention. In the present specification and drawings, any element same as that already described with reference to an already described drawing is denoted by the same reference sign, and detailed description thereof is omitted as appropriate in some cases.

Common Configuration of Embodiments and the Like

Figure 1:
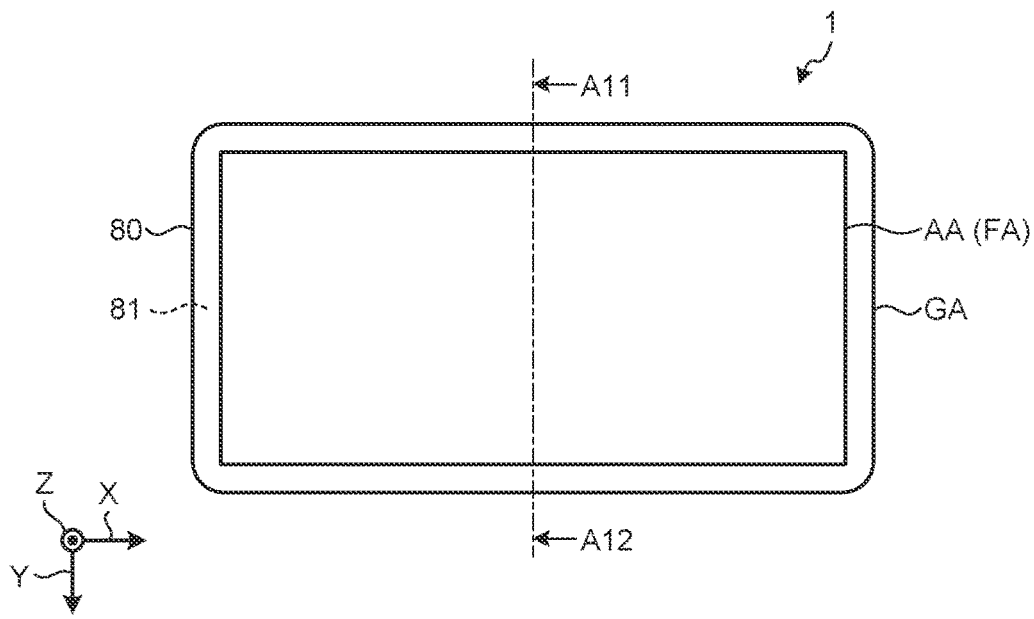
Figure 2:
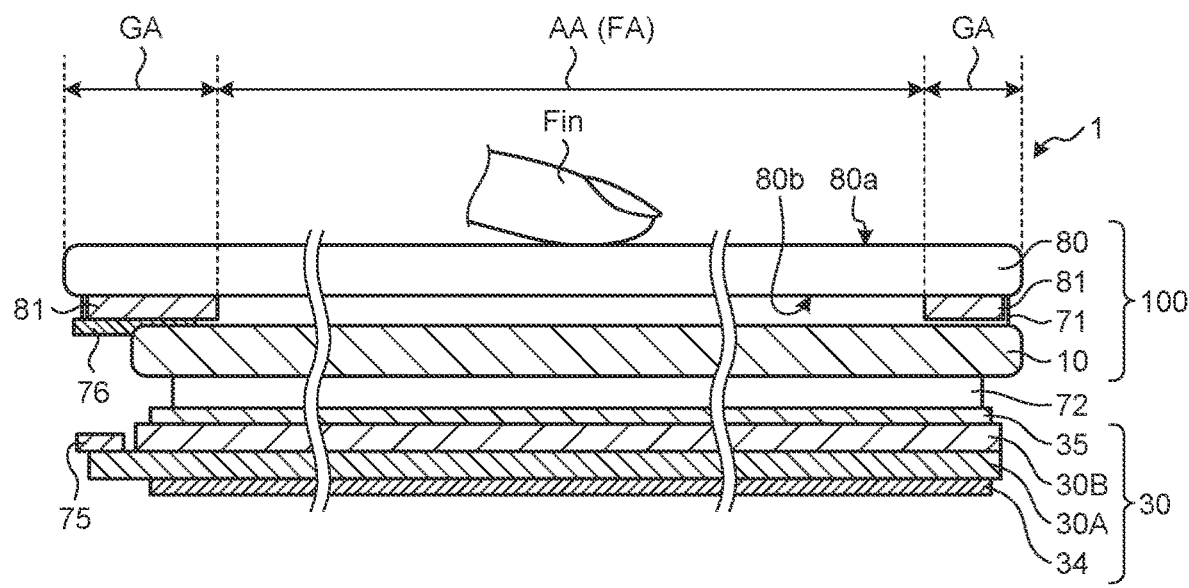
FIG. 2 is a sectional view of the display device illustrated in FIG. 1, taken along line A11-A12.

FIG. 1 is a plan view illustrating a configuration of a display device, which is common to the embodiments and the like. The embodiments and the like include a first embodiment, a second embodiment, a third embodiment, and modifications thereof to be described later. FIG. 2 is a sectional view of the display device illustrated in FIG. 1, taken along line A11-A12. This display device 1 illustrated in FIG. 1 is a fingerprint-detection display device and has a display region AA for displaying an image, a fingerprint detection region FA, and a frame region GA provided outside the display region AA and the fingerprint detection region FA. The fingerprint detection region FA is a region for detecting asperities on a surface of a finger or the like in contact with or in proximity to a cover member 80. In the display device 1, the display region AA and the fingerprint detection region FA are identical or substantially identical to each other, so that a fingerprint can be detected on the entire surface of the display region AA. The shapes of the display region AA and the fingerprint detection region FA are, for example, rectangular.

As illustrated in FIG. 2, the display device 1 includes a display panel 30 and a fingerprint detection device 100. The fingerprint detection device 100 includes a fingerprint sensor 10 and the cover member 80. The cover member 80 is a plate member having a first surface 80a and a second surface 80b on an opposite side to the first surface 80a. The first surface 80a of the cover member 80 is a detection surface for detecting asperities on the surface of a finger or the like in contact therewith or in proximity thereto and is a display surface on which an image displayed by the display panel 30 is viewed by a viewer. The fingerprint sensor 10 and the display panel 30 are provided on the second surface 80b side of the cover member 80. The cover member 80 is a member for protecting the fingerprint sensor 10 and the display panel 30 and covers the fingerprint sensor 10 and the display panel 30. The cover member 80 is, for example, a glass substrate or a resin substrate.

The cover member 80, the fingerprint sensor 10, and the display panel 30 are each not limited to a rectangular shape in a plan view but may each have a circular shape, an elliptical shape, or an irregular shape in which part of any of these outer shapes is omitted. The cover member 80 is not limited to a flat plate shape. For example, in a case in which the display region AA and the fingerprint detection region FA each have a curved surface or the frame region GA has a surface curved toward the display panel 30, the cover member 80 may also have a curved surface. In this case, the display device is a curved-surface display having a fingerprint detection function, and a fingerprint can be detected on a curved surface of the curved-surface display. A "plan view" is a view in a direction orthogonal to one surface 101a of a substrate 101 illustrated in FIG. 3 to be described later. The direction orthogonal to the one surface 101a is a "normal direction Z of the substrate 101".

As illustrated in FIGS. 1 and 2, a decorative layer 81 is provided on the second surface 80b of the cover member 80 in the frame region GA. The decorative layer 81 is a colored layer having a light transmittance lower than that of the cover member 80. The decorative layer 81 can restrain wiring, circuits, and the like overlapping the frame region GA from being visually recognized by a viewer. In the example illustrated in FIG. 2, the decorative layer 81 is provided on the second surface 80b, but may be provided on the first surface 80a. The decorative layer 81 is not limited to a single layer but may have a structure in which a plurality of layers are stacked.

The fingerprint sensor 10 is a detector for detecting asperities on a surface of a finger Fin or the like in contact with or in proximity to the first surface 80a of the cover member 80. As illustrated in FIG. 2, the fingerprint sensor 10 is provided between the cover member 80 and the display panel 30. The fingerprint sensor 10 overlaps the fingerprint detection region FA and part of the frame region GA when viewed in a direction (normal direction) orthogonal to the first surface 80a. The fingerprint sensor 10 is coupled to a flexible board 76 in the frame region GA. A detection integrated circuit (IC) (not illustrated) for controlling detection operation of the fingerprint sensor 10 is mounted on the flexible board 76.

The fingerprint sensor 10 has one surface bonded to the second surface 80b of the cover member 80 with a bonding layer 71 interposed therebetween and has the other surface bonded to a polarization plate 35 of the display panel 30 with a bonding layer 72 interposed therebetween. The bonding layer 71 and the bonding layer 72 are bonding agents or resin having a light-transmitting property and transmit visible light.

The display panel 30 includes a pixel substrate 30A, a counter substrate 30B, a polarization plate 34 provided on the lower side of the pixel substrate 30A, and the polarization plate 35 provided on the upper side of the counter substrate 30B. A display IC (not illustrated) for controlling display operation of the display panel 30 is coupled to the pixel substrate 30A through a flexible substrate 75. The display panel 30 is a liquid crystal panel in which a liquid crystal display element is used as a display functional layer. The display panel 30 is not limited thereto but may be, for example, an organic electroluminescent (EL) display panel. The detection IC and the display IC described above may be provided on a control board outside a module. Alternatively, the detection IC may be provided on the substrate 101 (refer to FIG. 3) of the fingerprint sensor 10. The display IC may be provided on a first substrate 31 (refer to FIG. 8) of the pixel substrate 30A.

Figure 3:
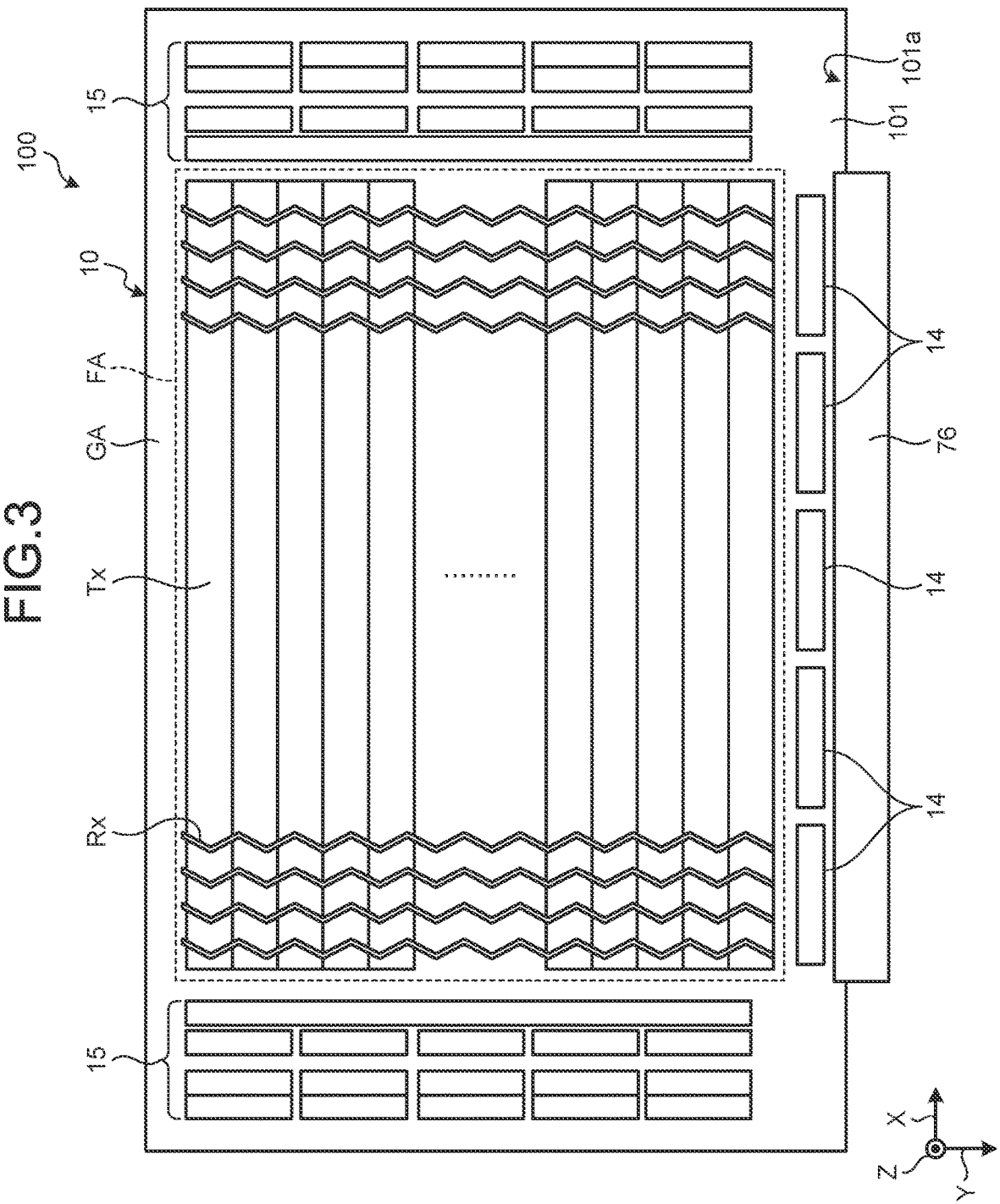

FIG. 3 is a plan view illustrating an exemplary configuration of the fingerprint detection device, which is common to the embodiments and the like. As illustrated in FIG. 3, the fingerprint detection device 100 includes the substrate 101 and the fingerprint sensor 10 provided on the one surface 101a side of the substrate 101. The fingerprint sensor 10 includes drive electrodes Tx and detection electrodes Rx. The detection electrodes Rx are stacked on the one surface 101a side of the substrate 101 such that the detection electrodes Rx are not in contact with the drive electrodes Tx. The detection electrode Rx is closer than the drive electrode Tx when viewed from the finger Fin side illustrated in FIG. 2. The substrate 101 is a light-transmitting glass substrate that transmits visible light. Alternatively, the substrate 101 may be a light-transmitting resin substrate or resin film made of resin such as polyimide. The fingerprint sensor 10 is a light-transmitting sensor. The drive electrode Tx is made of a light-transmitting conductive material such as indium tin oxide (ITO).

The drive electrodes Tx are arranged in a second direction Y. Each drive electrode Tx extends in a first direction X. The detection electrodes Rx are arranged in the first direction X. Each detection Rx extends in the second direction Y. In this manner, the detection electrodes Rx extend in a direction intersecting the extension direction of the drive electrodes Tx. Each detection electrode Rx is coupled to the flexible substrate 75 provided on a short side of the frame region GA of the substrate 101 through a frame wiring (not illustrated). Each drive electrode Tx is made of a light-transmitting conductive material such as ITO. As illustrated in FIG. 3, the drive electrodes Tx and the detection electrodes Rx are provided in the fingerprint detection region FA.

Capacitance is formed at each of intersection parts between the detection electrodes Rx and the drive electrodes Tx. When mutual capacitive touch detection operation is performed by the fingerprint sensor 10, a drive electrode driver 15 sequentially selects the drive electrodes Tx in a time divisional manner and supplies a drive signal Vs to each selected drive electrode Tx. Then, a detection signal Vdet corresponding to a capacitance change due to asperities on a surface of a finger or the like in a contact state or in a proximity state is output from the detection electrode Rx, and thus, fingerprint detection is performed. The drive electrode driver 15 may sequentially select and drive each drive electrode block including more than one of the drive electrodes Tx.

FIG. 3 illustrates the configuration in which various circuits such as a detection electrode selection circuit 14 and the drive electrode driver 15 are provided in the frame region GA of the substrate 101, but the configuration is merely exemplary. At least some of the various circuits may be included in the detection IC mounted on the flexible board 76.

Figure 4:
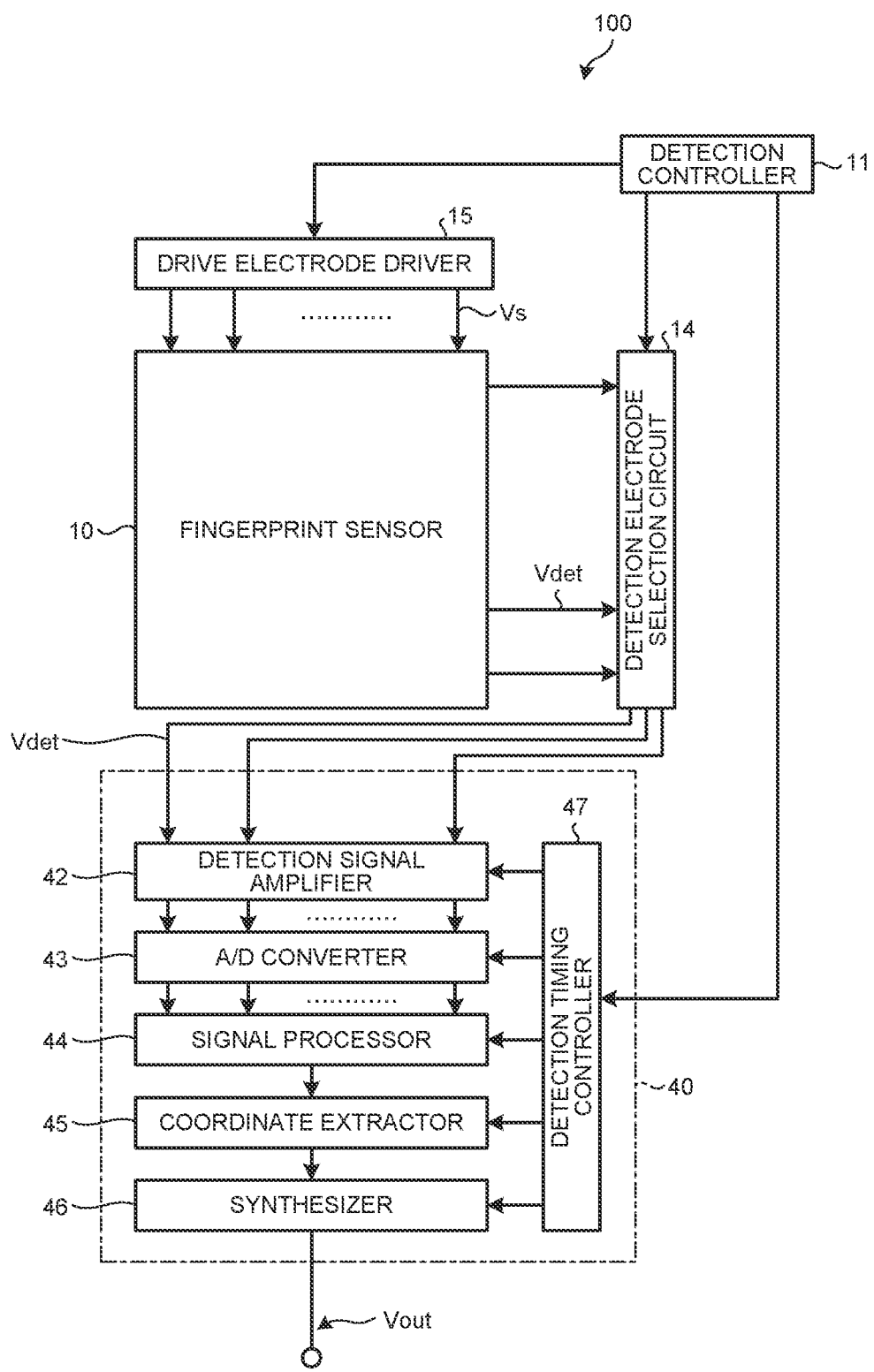
FIG. 4 is a block diagram illustrating an exemplary configuration of the fingerprint detection device.

The following describes the configuration of the fingerprint detection device in detail. FIG. 4 is a block diagram illustrating an exemplary configuration of a fingerprint detection device including a fingerprint sensor. As illustrated in FIG. 4, this fingerprint detection device 100 includes the fingerprint sensor 10, a detection controller 11, the drive electrode driver 15, the detection electrode selection circuit 14, and a detector 40.

The detection controller 11 is a circuit configured to control detection operation of the fingerprint sensor 10. The drive electrode driver 15 is a circuit configured to supply the drive signal Vs for detection to the drive electrodes Tx of the fingerprint sensor 10 based on a control signal supplied from the detection controller 11. The detection electrode selection circuit 14 selects a detection electrode Rx of the fingerprint sensor 10 based on a control signal supplied from the detection controller 11 and couples the selected detection electrode Rx to the detector 40.

The detector 40 is a circuit configured to detect the shape of a fingerprint by detecting asperities on a surface of a finger or the like in contact with or in proximity to the first surface 80a of the cover member 80 based on a control signal supplied from the detection controller 11 and the detection signal Vdet output from the detection electrode Rx. The detector 40 includes a detection signal amplifier 42, an analog-to-digital (A/D) converter 43, a signal processor 44, a coordinate extractor 45, a synthesizer 46, and a detection timing controller 47. The detection timing controller 47 performs such control based on a control signal supplied from the detection controller 11 that the detection signal amplifier 42, the A/D converter 43, the signal processor 44, the coordinate extractor 45, and the synthesizer 46 operate in synchronization.

Each detection signal Vdet is supplied from the fingerprint sensor 10 to the detection signal amplifier 42 of the detector 40. The detection signal amplifier 42 amplifies the detection signal Vdet. The A/D converter 43 converts an analog signal output from the detection signal amplifier 42 into a digital signal.

The signal processor 44 is a logic circuit configured to detect whether a finger is in contact with or in proximity to the fingerprint sensor 10 based on an output signal from the A/D converter 43. The signal processor 44 performs processing of obtaining a signal (absolute value $|\Delta V|$) of difference of detection signals due to a finger. The signal processor 44 compares the absolute value $|\Delta V|$ with a predetermined threshold voltage. When the absolute value $|\Delta V|$ is smaller than the threshold voltage, the signal processor 44 determines that a finger is in a non-contact state. When the absolute value $|\Delta V|$ is equal to or larger than the threshold voltage, the signal processor 44 determines that a finger is in a contact state or in a proximity state. In this manner, the detector 40 can detect whether or not a finger is in a contact state or in a proximity state.

The coordinate extractor 45 is a logic circuit configured to calculate detection coordinates when the signal processor 44 has detected that a finger is in a contact state or in a proximity state. The coordinate extractor 45 outputs the detection coordinates to the synthesizer 46. The synthesizer 46 combines the detection signals Vdet output from the fingerprint sensor 10 and generates two-dimensional information indicating the shape of the finger in a contact state or in a proximity state. The synthesizer 46 outputs the two-dimensional information as an output Vout from the detector 40. Alternatively, the synthesizer 46 may generate an image based on the two-dimensional information and output image information as the output Vout.

The above-described detection IC functions as the detector 40 illustrated in FIG. 4. Some functions of the detector 40 may be included in the above-described display IC or may be provided as functions of an external microprocessing unit (MPU).

Figure 5:
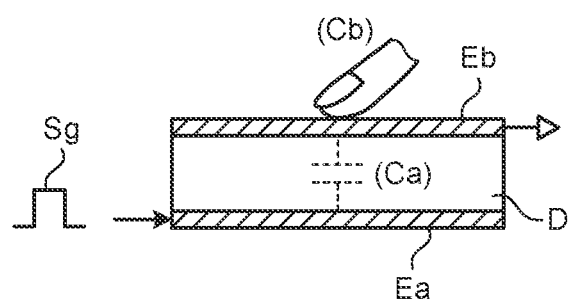
FIG. 5 is an explanatory diagram for description of the fundamental principle of mutual capacitive detection.
Figure 6:
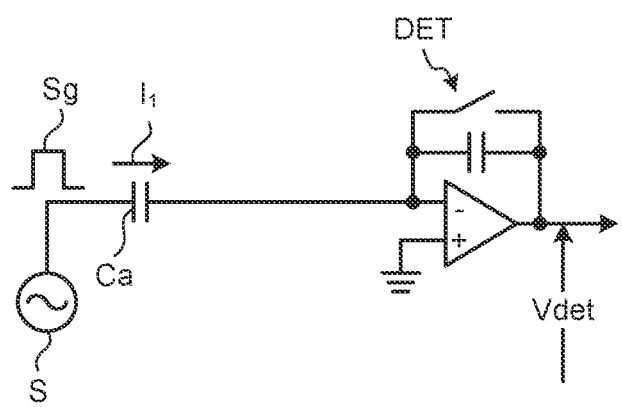
FIG. 6 is an explanatory diagram illustrating an exemplary equivalent circuit for description of the fundamental principle of the mutual capacitive detection.
Figure 7:
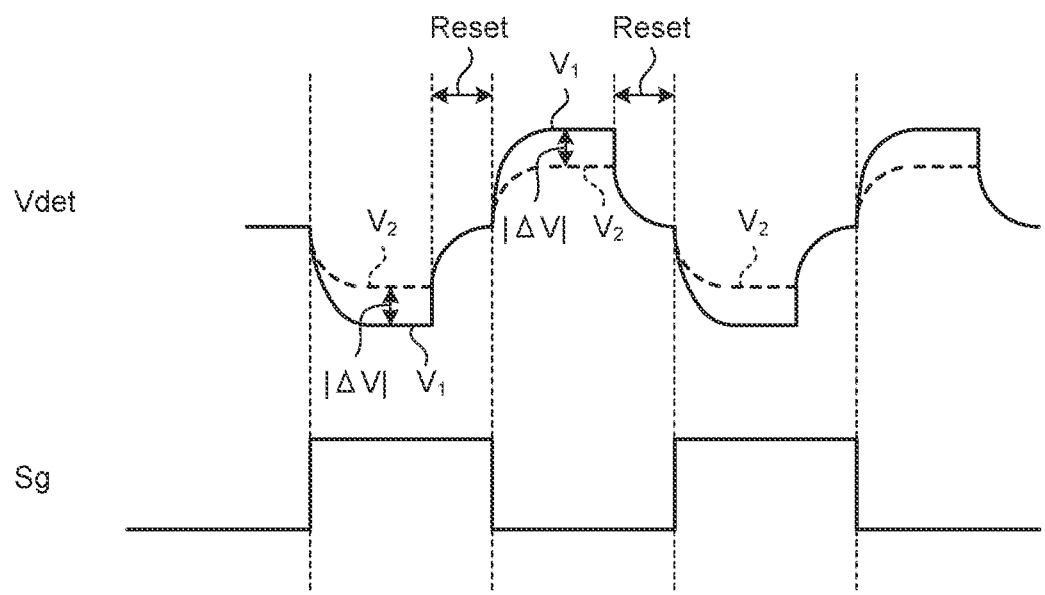
FIG. 7 is a diagram illustrating exemplary waveforms of a drive signal and a detection signal of the mutual capacitive detection.

The fingerprint sensor 10 operates based on the fundamental principle of capacitive detection. The following describes the fundamental principle of mutual capacitive detection by the fingerprint sensor 10 with reference to FIGS. 5 to 7. FIG. 5 is an explanatory diagram for description of the fundamental principle of mutual capacitive detection. FIG. 6 is an explanatory diagram illustrating an exemplary equivalent circuit for description of the fundamental principle of mutual capacitive detection. FIG. 7 is a diagram illustrating exemplary waveforms of a drive signal and a detection signal of mutual capacitive detection. The following description is made on a case in which a finger is in a contact state or in a proximity state, but the detection target object is not limited to a finger and can be, for example, an object including a conductor such as a stylus pen.

For example, as illustrated in FIG. 5, a capacitive element Ca includes a pair of electrodes: a drive electrode Ea and a detection electrode Eb opposed to each other with a dielectric D interposed therebetween. At the capacitive element Ca, in addition to lines of electric force (not illustrated) generated between facing surfaces of the drive electrode Ea and the detection electrode Eb, fringe lines of electric force extending from an end part of the drive electrode Ea toward the upper surface of the detection electrode Eb are generated. As illustrated in FIG. 6, the capacitive element Ca has one end coupled to an alternating-current signal source (drive signal source) S and the other end coupled to a voltage detector DET. The voltage detector DET is, for example, an integration circuit included in the detector 40 illustrated in FIG. 4.

When an alternating-current square wave Sg of a predetermined frequency (for example, several kHz to several hundred kHz) is applied from the alternating-current signal source S to the drive electrode Ea (one end of the capacitive element Ca), an output waveform (the detection signal Vdet) as illustrated in FIG. 7 is generated through the voltage detector DET coupled to the detection electrode Eb (the other end of the capacitive element Ca). The alternating-current square wave Sg corresponds to the drive signal Vs that is input from the drive electrode driver 15 illustrated in FIG. 4.

In a state (non-contact state) in which no finger is in contact with or in proximity to the detection electrode Eb, current in accordance with the capacitance value of the capacitive element Ca flows along with charging and discharging of the capacitive element Ca. The voltage detector DET illustrated in FIG. 6 converts variation in current $I_1$ in accordance with the alternating-current square wave Sg into variation in voltage (solid-line waveform V1 (refer to FIG. 7)).

In a state (contact state) in which a finger is in contact with or in proximity to the detection electrode Eb, as illustrated in FIG. 5, capacitance Cb formed by the finger is in contact with or in proximity to the detection electrode Eb. Thus, the fringe lines of electric force between the drive electrode Ea and the detection electrode Eb are interrupted by the conductor (finger). Thus, the capacitive element Ca acts as a capacitive element having a capacitance value smaller than the capacitance value in the non-contact state. Then, as illustrated in FIGS. 6 and 7, the voltage detector DET converts variation of the current $I_1$ in accordance with the alternating-current square wave Sg into voltage variation (dotted-line waveform V2).

In this case, the amplitude of the waveform V2 is smaller than the amplitude of the above-described waveform V1. Thus, the absolute value |ΔV| of voltage difference between the waveform V1 and the waveform V2 changes in accordance with the influence of an external object in contact with or in proximity to the detection electrode Eb from the outside, such as a finger. To accurately detect the absolute value |ΔV| of voltage difference between the waveform V1 and the waveform V2, the voltage detector DET preferably performs operation provided with a period Reset for resetting charging and discharging of the capacitor by performing switching in the circuitry in accordance with the frequency of the alternating-current square wave Sg.

The detector 40 compares the absolute value |ΔV| with a predetermined threshold voltage. When the absolute value |ΔV| is smaller than the threshold voltage, the detector 40 determines that no finger is in a contact state. When the absolute value |ΔV| is equal to or larger than the threshold voltage, the detector 40 determines that a finger is in a contact state or in a proximity state. When having determined that a finger is in a contact state or in a proximity state, the detector 40 detects a capacitance change due to asperities on the surface of the finger based on difference in the absolute values |ΔV|. The drive electrode Ea illustrated in FIG. 5 corresponds to each drive electrode Tx illustrated in FIG. 3, and the detection electrode Eb illustrated in FIG. 5 corresponds to each detection electrode Rx illustrated in FIG. 3.

Figure 8:
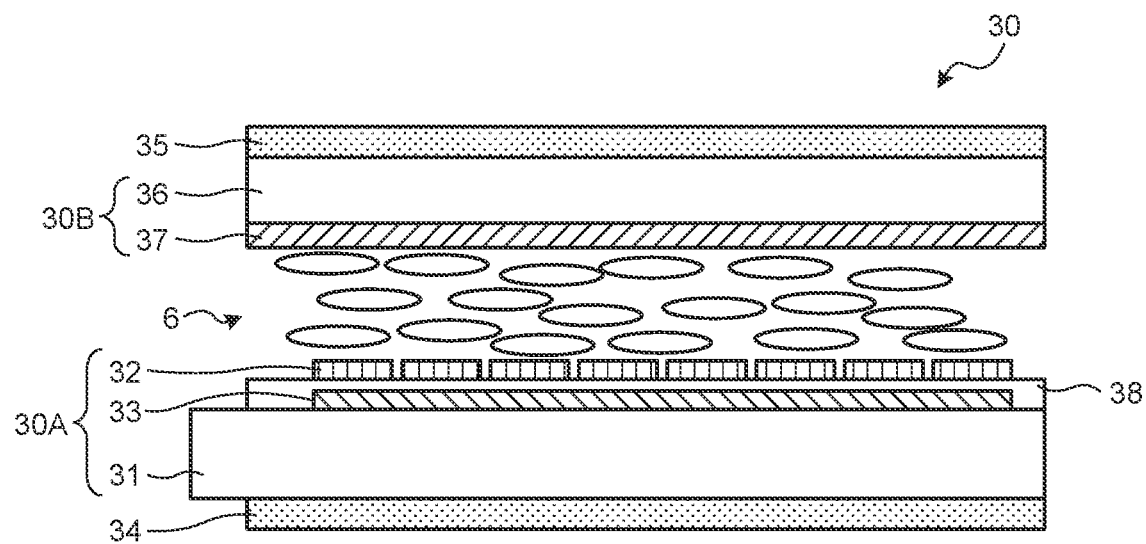
FIG. 8 is a sectional view illustrating an exemplary configuration of a display panel.

FIG. 8 is a sectional view illustrating an exemplary configuration of the display panel. The pixel substrate 30A includes the first substrate 31, pixel electrodes 32, and a common electrode 33. The common electrode 33 is provided on the first substrate 31. The pixel electrodes 32 are provided on the upper side of the common electrode 33 with an insulating layer 38 interposed therebetween and are disposed in a matrix (row-column configuration) in a plan view. The pixel electrodes 32 are respectively provided for sub pixels constituting pixels Pix of the display panel 30, and each of the pixel electrode 32 is supplied with a pixel signal for performing display operation. The common electrode 33 is supplied with a direct-current display drive signal and functions as a common electrode for the pixel electrodes 32.

The common electrode 33, the insulating layer 38, and the pixel electrodes 32 are stacked in the stated order on the first substrate 31. The polarization plate 34 is provided on the lower side of the first substrate 31 with a bonding layer interposed therebetween. A thin film transistor (TFT; not illustrated) that is a display switching element is disposed on the first substrate 31. The pixel electrodes 32 and the common electrode 33 are made of, for example, a light-transmitting conductive material such as ITO.

The arrangement of the pixel electrodes 32 is not limited to a matrix arrangement (row-column configuration) in which the pixel electrodes 32 are arrayed in the second direction and the first direction orthogonal to the second direction, but may be an arrangement in which adjacent pixel electrodes 32 are shifted from each other in the second direction or the first direction. Alternatively, depending on size difference between adjacent pixel electrodes 32, two or three pixel electrodes 32 may be arrayed on one side of one pixel electrode 32 included in a line of pixels arrayed in the second direction.

The counter substrate 30B includes a second substrate 36 and a color filter 37 formed on one surface of the second substrate 36. The color filter 37 is opposed to a liquid crystal layer 6 in a direction orthogonal to the first substrate 31. In addition, the polarization plate 35 is provided on the second substrate 36 with a bonding layer interposed therebetween. The color filter 37 may be disposed on the first substrate 31. The first substrate 31 and the second substrate 36 are, for example, glass substrates or resin substrates.

The liquid crystal layer 6 is provided between the first substrate 31 and the second substrate 36. The liquid crystal layer 6 modulates light passing therethrough in accordance with the state of electric field and is, for example, liquid crystal of a horizontal electric field mode such as in-plane switching (IPS) including fringe field switching (FFS). An alignment film may be disposed between the liquid crystal layer 6 and the pixel substrate 30A and between the liquid crystal layer 6 and the counter substrate 30B in FIG. 8.

An illuminator (backlight), which is not illustrated, is provided below the first substrate 31. The illuminator includes a light source such as an LED and emits light from the light source toward the first substrate 31. The light from the illuminator passes through the pixel substrate 30A. Depending on the state of the liquid crystal at the position at which the light has passed through the pixel substrate 30A, a first state in which the light is interrupted and is not transmitted and a second state in which the light is transmitted are switched, so that an image is displayed on the display surface (first surface 80a).

As illustrated in FIG. 2, the display panel 30 is bonded to the fingerprint sensor 10 in the display region AA with the bonding layer 72 interposed therebetween, the bonding layer 72 being provided on the polarization plate 35. The fingerprint sensor 10 is disposed closer to the cover member 80 in a direction orthogonal to the second surface 80b of the cover member 80 than the display panel 30 is. Since the fingerprint sensor 10 is provided on the cover member 80 side, the distance between each detection electrode Rx and the first surface 80*a* as the detection surface can be shortened as compared to, for example, a configuration in which fingerprint-detection detection electrodes are provided integrally with the display panel 30. Thus, detection performance can be improved with the display device 1.

The configuration described with reference to FIGS. 1 to 8 is common to the embodiments and their modifications to be described later. However, the X-Y plane shapes of the drive electrodes Tx and the detection electrodes Rx in FIG. 3 are illustrated to indicate their positional relation and do not necessarily correspond to specific X-Y plane shapes of the drive electrodes Tx and the detection electrodes Rx in the embodiments and their modifications to be described later.

The following describes the X-Y plane shapes of the drive electrodes Tx and the detection electrodes Rx in the embodiments and their modifications. The first direction X and the second direction Y intersect each other. Specifically, for example, an X direction and a Y direction are orthogonal to each other.

First Embodiment

Figure 9:
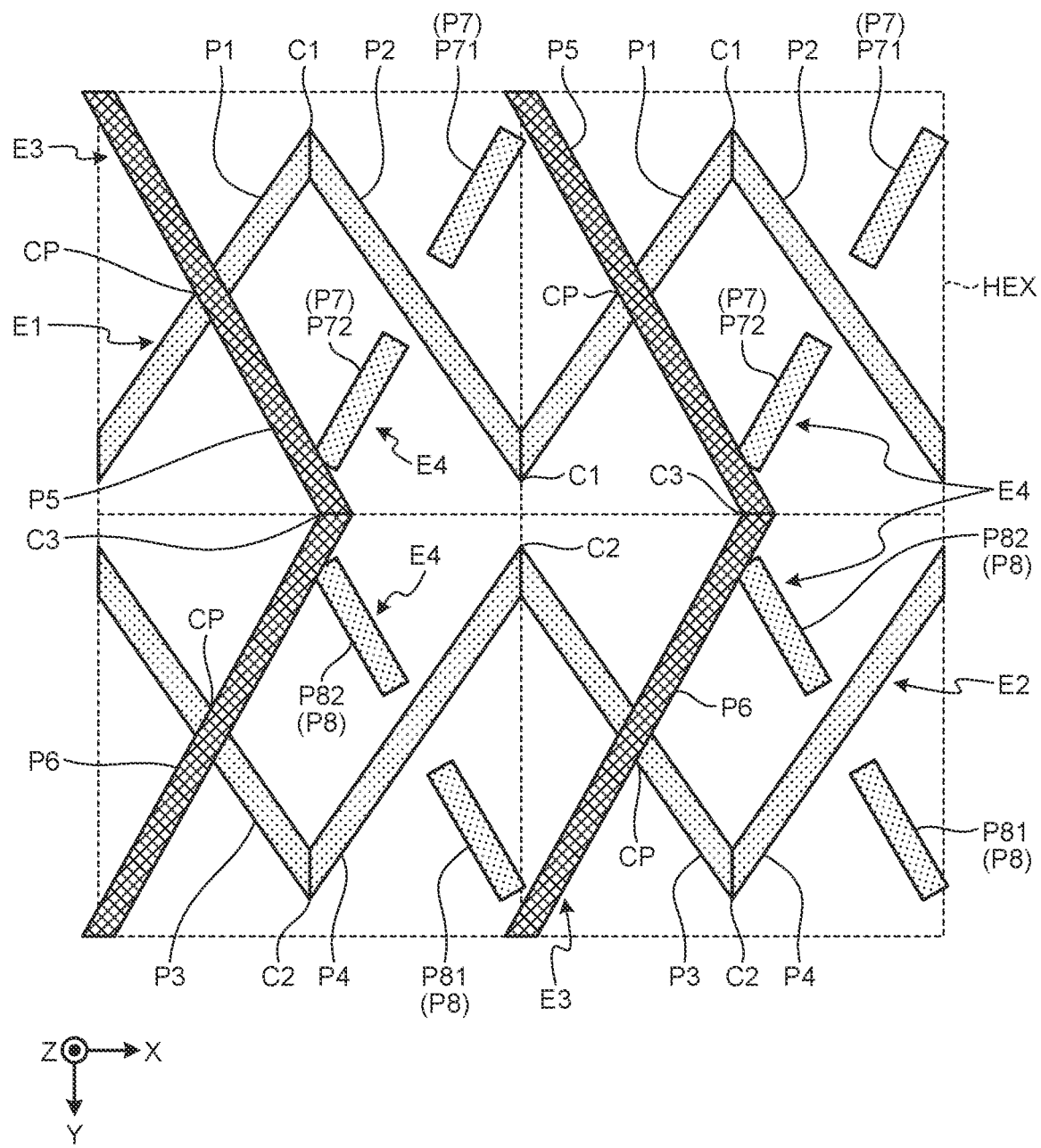
FIG. 9 is a diagram illustrating the X-Y plane shapes of drive electrodes and detection electrodes and an exemplary positional relation between the drive electrodes and the detection electrodes in a first embodiment.

FIG. 9 is a diagram illustrating the X-Y plane shapes of drive electrodes Tx and detection electrodes Rx in the first embodiment and an exemplary positional relation between the drive electrodes Tx and the detection electrodes Rx.

The drive electrodes Tx include a first electrode E1 and a second electrode E2 disposed line-symmetric about the first direction X in a non-contact positional relation.

The first electrode E1 includes a first extension part P1 extending in a third direction, a second extension part P2 extending in a fourth direction, and a first coupling part C1 through which the first extension part P1 and the second extension part P2 are coupled to each other.

The third direction is a direction extending along the X-Y plane and intersecting the first direction X and the second direction Y. The fourth direction is a direction extending along the X-Y plane and intersecting the first direction X, the second direction Y, and the third direction.

The second electrode E2 includes a third extension part P3 extending in the fourth direction, a fourth extension part P4 extending in the third direction, and a second coupling part C2 through which the third extension part P3 and the fourth extension part P4 are coupled to each other.

The first electrode E1 is one electrode in which the first extension part P1 and the second extension part P2 are continuous through the first coupling part C1. The second electrode E2 is one electrode in which the third extension part P3 and the fourth extension part P4 are continuous through the second coupling part C2. These electrodes are continuous as a whole in the first direction X.

The detection electrodes Rx illustrated in FIG. 9 includes third electrodes E3. The third electrode E3 includes a fifth extension part P5 extending in a fifth direction, a sixth extension part P6 extending in a sixth direction, and a third coupling part C3 through which the fifth extension part P5 and the sixth extension part P6 are coupled to each other.

The fifth direction is a direction extending along the X-Y plane and intersecting the first direction X and the second direction Y. The sixth direction is a direction extending along the X-Y plane and intersecting the first direction X, the second direction Y, and the fifth direction. The fifth direction may be parallel to the third direction. The sixth direction may be parallel to the fourth direction.

The third electrode E3 is one electrode in which the fifth extension part P5 and the sixth extension part P6 are continuous through the third coupling part C3. Such continuation extends in the second direction Y.

In the example illustrated in FIG. 9, a fourth electrode E4 is provided in the same layer as the drive electrode Tx (the drive electrode Ea in FIG. 5). The first electrode E1 and the second electrode E2 correspond to the drive electrode Ea in FIG. 5. The third electrode E3 corresponds to the detection electrode Eb in FIG. 5. Specifically, the positions of the third electrode E3 and the fourth electrode E4 in the normal direction Z are different. The third electrode and the fourth electrode are disposed line-symmetric about the second direction Y in such a manner that the third electrode and the fourth electrode are not in contact with each other.

The fourth electrode E4 includes a seventh extension part P7 extending in the sixth direction and an eighth extension part P8 extending in fifth direction.

The fourth electrode E4 illustrated in FIG. 9 is a dummy electrode. Specifically, the seventh extension part P7 includes a first piece P71 and a second piece P72. The first piece P71 and the second piece P72 are disposed at positions opposed to each other with the second extension part P2 interposed therebetween. The first piece P71 and the second piece P72 each have a longitudinal direction along the sixth direction. The eighth extension part P8 includes a first piece P81 and a second piece P82. The first piece P81 and the second piece P82 are disposed at positions opposed to each other with the fourth extension part P4 interposed therebetween. The first piece P81 and the second piece P82 each have a longitudinal direction along the fifth direction. The first pieces P71 and P81 and the second pieces P72 and P82 are each electrically coupled to no other electrodes. A drive signal provided to the drive electrode Tx is not provided to the first pieces P71 and P81 and the second pieces P72 and P82. Moreover, capacitance that is generated at an intersection point CP at which the drive electrode Tx and the detection electrode Rx overlap in an X-Y plan view, is not generated at the first pieces P71 and P81 and the second pieces P72 and P82.

As used herein, a unit region HEX denotes a region enclosing one extension part extending in the third direction, one extension part extending in the fourth direction, and one coupling part through which these extension parts are coupled to each other in the drive electrode Tx. The unit region HEX encloses any of a set of one first extension part P1, one second extension part P2, and one first coupling part C1, and a set of one third extension part P3, one fourth extension part P4, and one second coupling part C2. One first coupling part C1 or one second coupling part C2 is positioned on the boundary line between unit regions HEX adjacent along the X direction. Such unit regions HEX are arranged in a matrix (row-column configuration) along the X direction and the Y direction.

A unit region HEX enclosing a set of one first extension part P1, one second extension part P2, and one first coupling part C1 includes one fifth extension part P5 and one seventh extension part P7. In such one unit region HEX, the first extension part P1 and the second extension part P2 extend in a manner line-symmetric about a Y-directional straight line passing over the first coupling part C1. The extension direction (fifth direction) of the fifth extension part P5 and the extension direction (sixth direction) of the seventh extension part P7 are line-symmetric about the straight line.

A unit region HEX enclosing a set of one third extension part P3, one fourth extension part P4, and one second coupling part C2 includes one sixth extension part P6 and one eighth extension part P8. In such one unit region HEX, the third extension part P3 and the fourth extension part P4 extend in a manner line-symmetric about a Y-directional straight line passing over the second coupling part C2. The extension direction (sixth direction) of the sixth extension part P6 and the extension direction (fifth direction) of the eighth extension part P8 are line-symmetric about the straight line.

The first extension part P1 and the second extension part P2 that are opposed to each other and interpose the boundary line between two unit regions HEX adjacent to each other in the X direction, extend in a manner line-symmetric about the boundary line. The third extension part P3 and the fourth extension part P4 that are opposed to each other and interpose the boundary line between two unit regions HEX adjacent in the X direction, extend in a manner line-symmetric about the boundary line. The fifth extension part P5 and the sixth extension part P6 that are opposed to each other and interpose the boundary line between two unit regions HEX adjacent in the Y direction, extend in a manner line-symmetric about the boundary line. The seventh extension part P7 and the eighth extension part P8 that are opposed to each other and interpose the boundary line between two unit regions HEX adjacent in the Y direction, extend in a manner line-symmetric about the boundary line.

Figure 10:
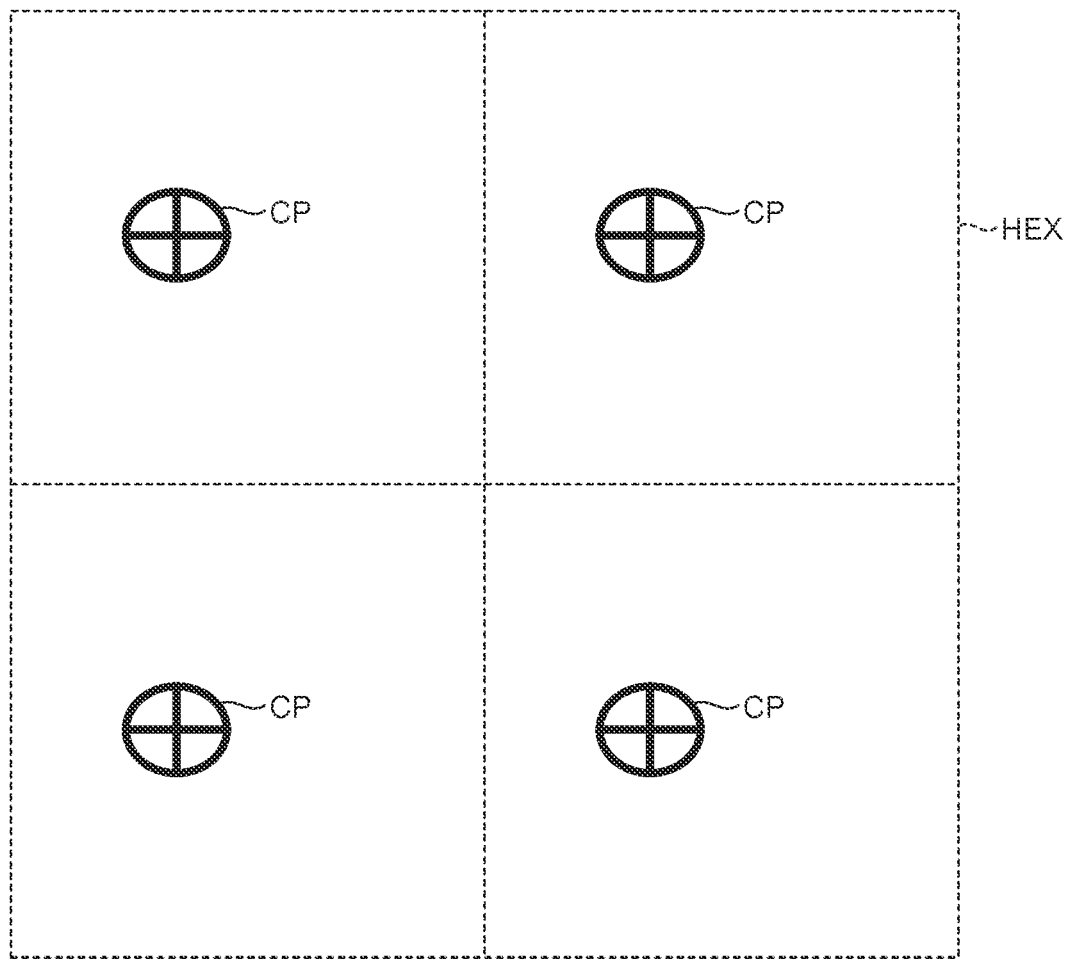
FIG. 10 is a diagram illustrating an exemplary positional relation between unit regions and intersection points in the first embodiment.
Figure 10:
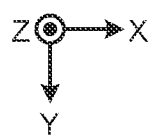
Figure 12:
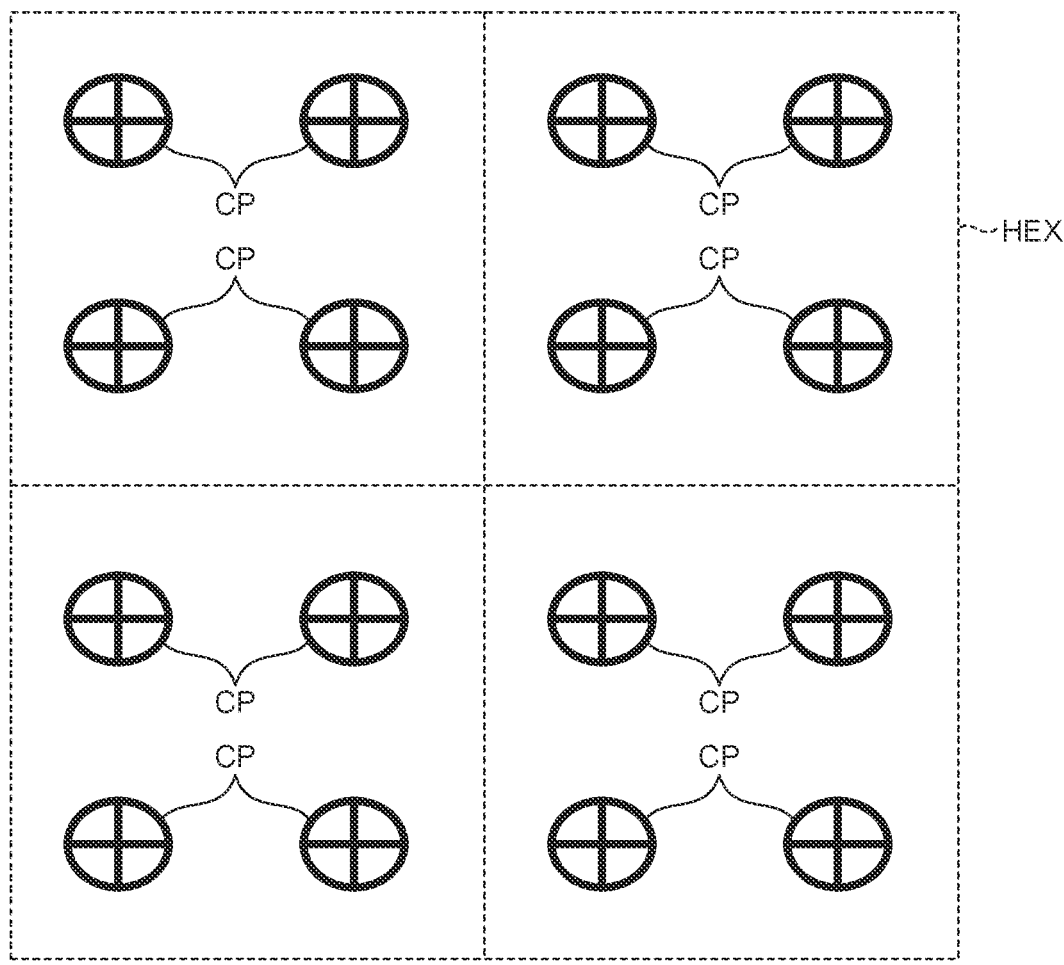
FIG. 12 is a diagram illustrating an exemplary positional relation between a unit region and an intersection point in the second embodiment.
Figure 12:
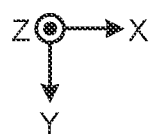

FIG. 10 is a diagram illustrating an exemplary positional relation between the unit regions HEX and the intersection points CP in the first embodiment. In FIG. 10 and FIG. 12 to be described later, the intersection point CP is illustrated with a circle having a cross therein to exaggerate the position of the intersection point CP.

The position of the intersection point CP in the unit region HEX enclosing a set of one first extension part P1, one second extension part P2, and one first coupling part C1 is a position at which the first extension part P1 and the fifth extension part P5 overlap in the X-Y plan view. The position of the intersection point CP in the unit region HEX enclosing a set of one third extension part P3, one fourth extension part P4, and one second coupling part C2 is a position at which the second extension part P2 and the sixth extension part P6 overlap in the X-Y plan view. In any unit region HEX, one intersection point CP exists for one unit region HEX. In a manner similar to the matrix (row-column configuration) of the unit regions HEX, a plurality of the intersection points CP are arranged in a matrix (row-column configuration) along the X direction and the Y direction.

Second Embodiment

Figure 11:
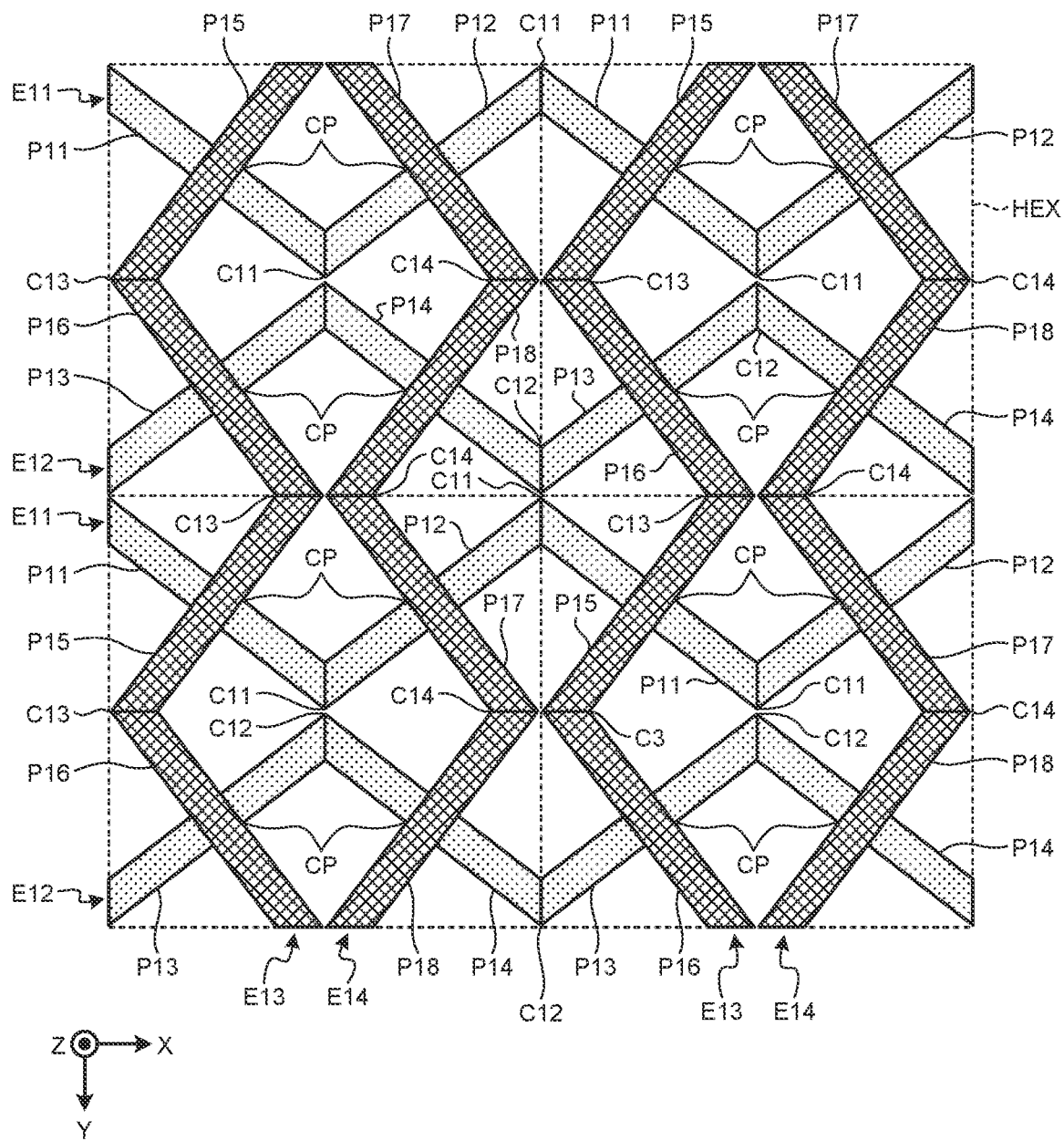
FIG. 11 is a diagram illustrating the X-Y plane shapes of drive electrodes and detection electrodes and an exemplary positional relation between the drive electrodes and the detection electrodes in a second embodiment.

FIG. 11 is a diagram illustrating the X-Y plane shapes of drive electrodes Tx and detection electrodes Rx in the second embodiment and an exemplary positional relation between the drive electrodes Tx and the detection electrodes Rx.

The drive electrode Tx includes a first electrode E11 and a second electrode E12 disposed line-symmetric about the first direction X in a non-contact positional relation.

The first electrode E11 includes a first extension part P11 extending in a third direction, a second extension part P12 extending in a fourth direction, and a first coupling part C11 through which the first extension part P11 and the second extension part P12 are coupled to each other.

The third direction is a direction extending along the X-Y plane and intersecting the first direction X and the second direction Y. The fourth direction is a direction extending along the X-Y plane and intersecting the first direction X, the second direction Y, and the third direction. The third direction in the first embodiment and the third direction in the second embodiment may be identical to or different from each other. The fourth direction in the first embodiment and the fourth direction in the second embodiment may be identical to or different from each other.

The second electrode E12 includes a third extension part P13 extending in the fourth direction, a fourth extension part P14 extending in the third direction, and a second coupling part C12 through which the third extension part P13 and the fourth extension part P14 are coupled to each other.

The first electrode E11 is one electrode in which the first extension part P11 and the second extension part P12 are continuous through the first coupling part C11. The second electrode E12 is one electrode in which the third extension part P13 and the fourth extension part P14 are continuous through the second coupling part C12. These electrodes are continuous as a whole in the first direction X.

The detection electrodes Rx illustrated in FIG. 11 include a third electrode E13 and a fourth electrode E14 disposed line-symmetric about the second direction Y in a non-contact positional relation.

The third electrode E13 includes a fifth extension part P15 extending in a fifth direction, a sixth extension part P16 extending in a sixth direction, and a third coupling part C13 through which the fifth extension part P15 and the sixth extension part P16 are coupled to each other.

The fifth direction is a direction extending along the X-Y plane and intersecting the first direction X and the second direction Y. The sixth direction is a direction extending along the X-Y plane and intersecting the first direction X, the second direction Y, and the fifth direction. The fifth direction may be parallel to the third direction. The sixth direction may be parallel to the fourth direction. The fifth direction in the first embodiment and the fifth direction in the second embodiment may be identical to or different from each other. The sixth direction in the first embodiment and the sixth direction in the second embodiment may be identical to or different from each other.

The third electrode E14 includes a seventh extension part P17 extending in the sixth direction, an eighth extension part P18 extending in the fifth direction, and a fourth coupling part C14 through which the seventh extension part P17 and the eighth extension part P18 are coupled to each other.

The third electrode E13 is one electrode in which the fifth extension part P15 and the sixth extension part P16 are continuous through the third coupling part C13. The fourth electrode E14 is one electrode in which the seventh extension part P17 and the eighth extension part P18 are continuous through the fourth coupling part C14. These electrodes are continuous as a whole in the second direction Y.

As used herein, a unit region HEX denotes a region enclosing one first extension part P11, one second extension part P12, one third extension part P13, one fourth extension part P14, one fifth extension part P15, one sixth extension part P16, one seventh extension part P17, and one eighth extension part P18. Such unit regions HEX are arranged in a matrix (row-column configuration) along the X direction and the Y direction.

In one unit region HEX, the first extension part P11 and the second extension part P12 extend in a manner line-symmetric about a Y-directional straight line passing over the first coupling part C11. In one unit region HEX, the third extension part P13 and the fourth extension part P14 extend in a manner line-symmetric about a Y-directional straight line passing over the second coupling part C12. In one unit region HEX, the fifth extension part P15 and the sixth extension part P16 extend in a manner line-symmetric about an X-directional straight line passing over the third coupling part C13. In one unit region HEX, the seventh extension part P17 and the eighth extension part P18 extend in a manner line-symmetric about an X-directional straight line passing over the fourth coupling part C14.

The first extension part P11 and the second extension part P12 that are opposed to each other and interpose the boundary line between two unit regions HEX adjacent in the X direction, extend in a manner line-symmetric about the boundary line. The third extension part P13 and the fourth extension part P14 that are opposed to each other and interpose the boundary line between two unit regions HEX adjacent in the X direction, extend in a manner line-symmetric about the boundary line. The fifth extension part P15 and the sixth extension part P16 that are opposed to each other and interpose the boundary line between two unit regions HEX adjacent in the Y direction, extend in a manner line-symmetric about the boundary line. The seventh extension part P17 and the eighth extension part P18 that are opposed to each other and interpose the boundary line between two unit regions HEX adjacent in the Y direction, extend in a manner line-symmetric about the boundary line.

FIG. 12 is a diagram illustrating an exemplary positional relation between each unit region HEX and each intersection point CP in the second embodiment.

The positions of the intersection points CP in one unit region HEX are a position at which the first extension part P11 and the fifth extension part P15 overlap in the X-Y plan view, a position at which the second extension part P12 and the seventh extension part P17 overlap in the X-Y plan view, a position at which the third extension part P13 and the sixth extension part P16 overlap in the X-Y plan view, and a position at which the fourth extension part P14 and the eighth extension part P18 overlap in the X-Y plan view. In any unit region HEX, four intersection points CP exist for one unit region HEX. The four intersection points CP enclosed in one unit region HEX are arranged in a 2×2 matrix (row-column configuration). In a manner similar to the matrix (row-column configuration) of the unit regions HEX, a plurality of the intersection points CP are arranged in a matrix (row-column configuration) along the X direction and the Y direction.

The following describes effects of the line-symmetric arrangement of the electrodes in the first and second embodiments with reference to FIGS. 13 to 17.

Figure 13:
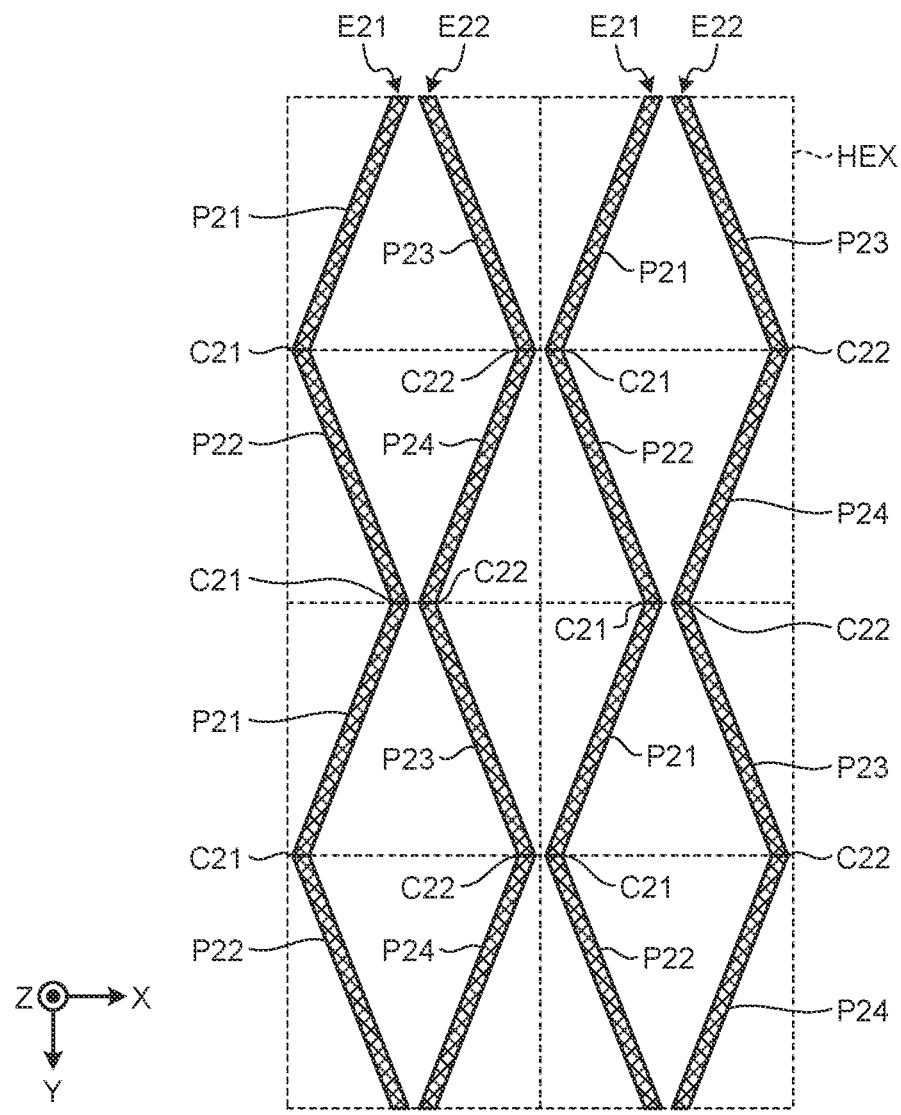
FIG. 13 is a diagram illustrating a first electrode and a second electrode disposed line-symmetric about a second direction in a non-contact positional relation.

FIG. 13 is a diagram illustrating a first electrode E21 and a second electrode E22 disposed line-symmetric about the second direction Y in a non-contact positional relation. The first electrode E21 and the second electrode E22 are, for example, the detection electrodes Rx. The first electrode E21 and the second electrode E22 may be the drive electrodes Tx. In this case, the X direction and the Y direction in description with reference to FIG. 13 are interchanged.

The first electrode E21 illustrated in FIG. 13 includes a first extension part P21 extending in a third direction, a second extension part P22 extending in a fourth direction, and a first coupling part C21 through which the first extension part P21 and the second extension part P22 are coupled to each other.

The third direction is a direction extending along the X-Y plane and intersecting the first direction X and the second direction Y. The fourth direction is a direction extending along the X-Y plane and intersecting the first direction X, the second direction Y, and the third direction. The third direction may be identical to or different from the third direction in at least one of the first and second embodiments. The fourth direction may be identical to or different from the fourth direction in at least one of the first and second embodiments.

The second electrode E22 illustrated in FIG. 13 includes a third extension part P23 extending in the fourth direction, a fourth extension part P24 extending in the third direction, and a second coupling part C22 through which the third extension part P23 and the fourth extension part P24 are coupled to each other.

The first electrode E21 is one electrode in which the first extension part P21 and the second extension part P22 are continuous through the first coupling part C21. The second electrode E22 is one electrode in which the third extension part P23 and the fourth extension part P24 are continuous through the second coupling part C22. These electrodes are continuous as a whole in the second direction Y in FIG. 13.

The first extension part P21 and the third extension part P23 extend in a manner line-symmetric about an X-directional straight line. The second extension part P22 and the fourth extension part P24 extend in a manner line-symmetric about an X-directional straight line. The first extension part P21 and the second extension part P22 that are continuous with the first coupling part C21 interposed therebetween extend in a manner line-symmetric about a Y-directional straight line passing over the first coupling part C21. The third extension part P23 and the fourth extension part P24 that are continuous with the second coupling part C22 interposed therebetween extend in a manner line-symmetric about a Y-directional straight line passing over the second coupling part C22.

As used herein, a unit region HEX denotes a region enclosing a pair of the first extension part P21 and the third extension part P23 or a pair of the second extension part P22 and the fourth extension part P24. The first coupling part C21 and the second coupling part C22 are positioned on the boundary line between the unit regions HEX arranged in the Y direction. Such unit regions HEX are arranged in a matrix (row-column configuration) along the X direction and the Y direction.

Figure 14:
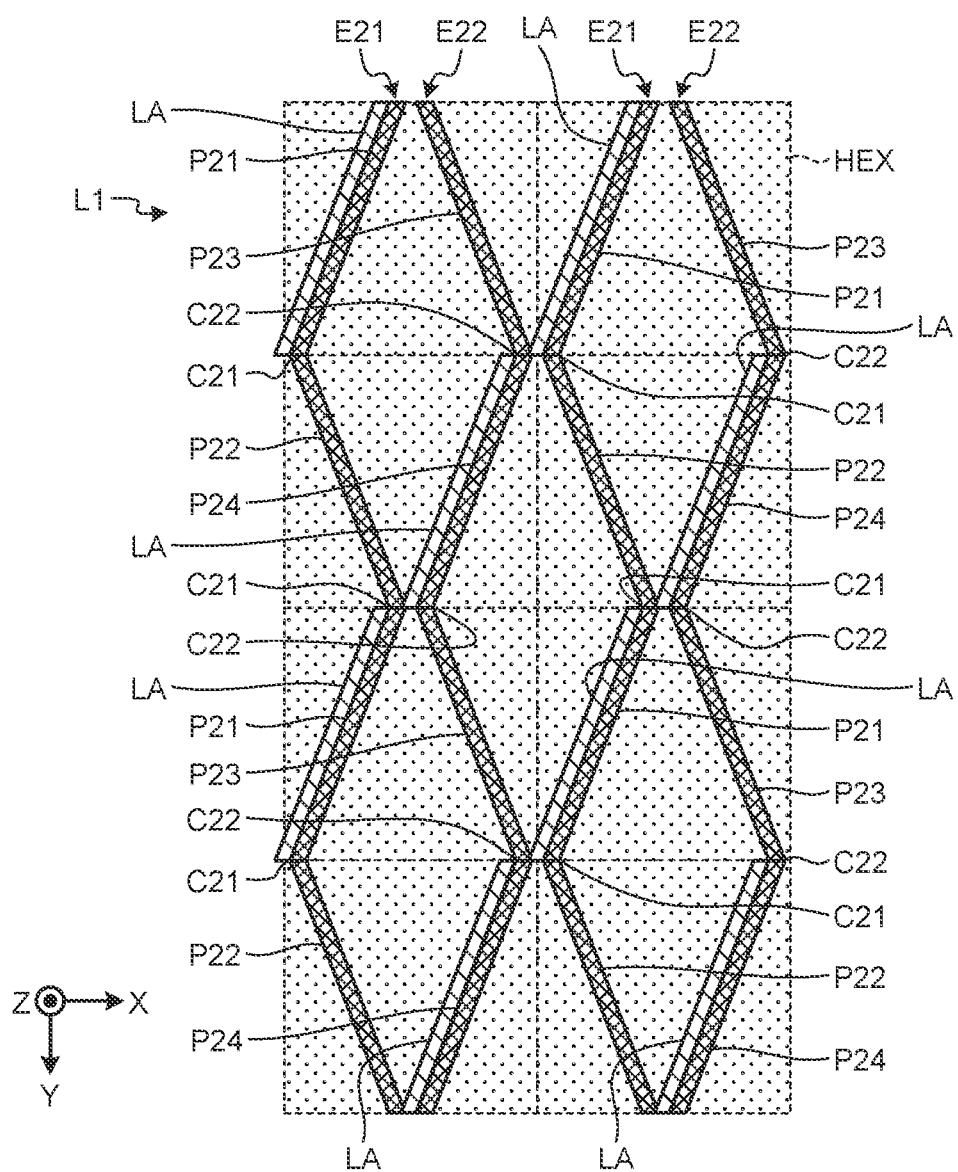
FIG. 14 is a schematic diagram illustrating the amount of reflected light from each unit region depending on external light.

FIG. 14 is a schematic diagram illustrating the amount of reflected light from each unit region HEX depending on external light L1. Although strong reflection regions LA are illustrated in FIG. 14 to schematically indicate that the amounts of visually-recognized light from the first extension part P21 and the fourth extension part P24 are larger than the amounts of visually-recognized light from the second extension part P22 and the third extension part P23, the strong reflection regions LA are not physical regions but are merely schematic illustrations. The amount of visually-recognized light is the amount of light perceived by a user visually recognizing the fingerprint detection region FA. The amount of visually-recognized light depends on the degree of light reflection at an electrode. The amount of visually-recognized light tends to be larger as the incident angle of light is closer to a right angle relative to the extension direction of the electrode.

For example, when, like the external light L1 illustrated in FIG. 14, light is incident on the fingerprint detection region FA at an angle with which the amounts of visually-recognized light from the first extension part P21 and the fourth extension part P24 are larger than the amounts of visually-recognized light from the second extension part P22 and the third extension part P23, the brightness of a part provided with the first extension part P21 or the fourth extension part P24 appears to be higher than the brightness of a part provided with the second extension part P22 or the third extension part P23. One unit region HEX encloses a pair of the first extension part P21 and the third extension part P23 or a pair of the second extension part P22 and the fourth extension part P24. That is, each unit region HEX encloses one first extension part P21 or one fourth extension part P24 at which the amount of visually-recognized light is relatively large and one second extension part P22 or one third extension part P23 at which the amount of visually-recognized light is relatively small. Thus, the amount of visually-recognized light per unit region HEX is substantially equal among unit regions HEX, and unevenness in brightness does not appear when the entire fingerprint detection region FA is viewed.

Figure 15:
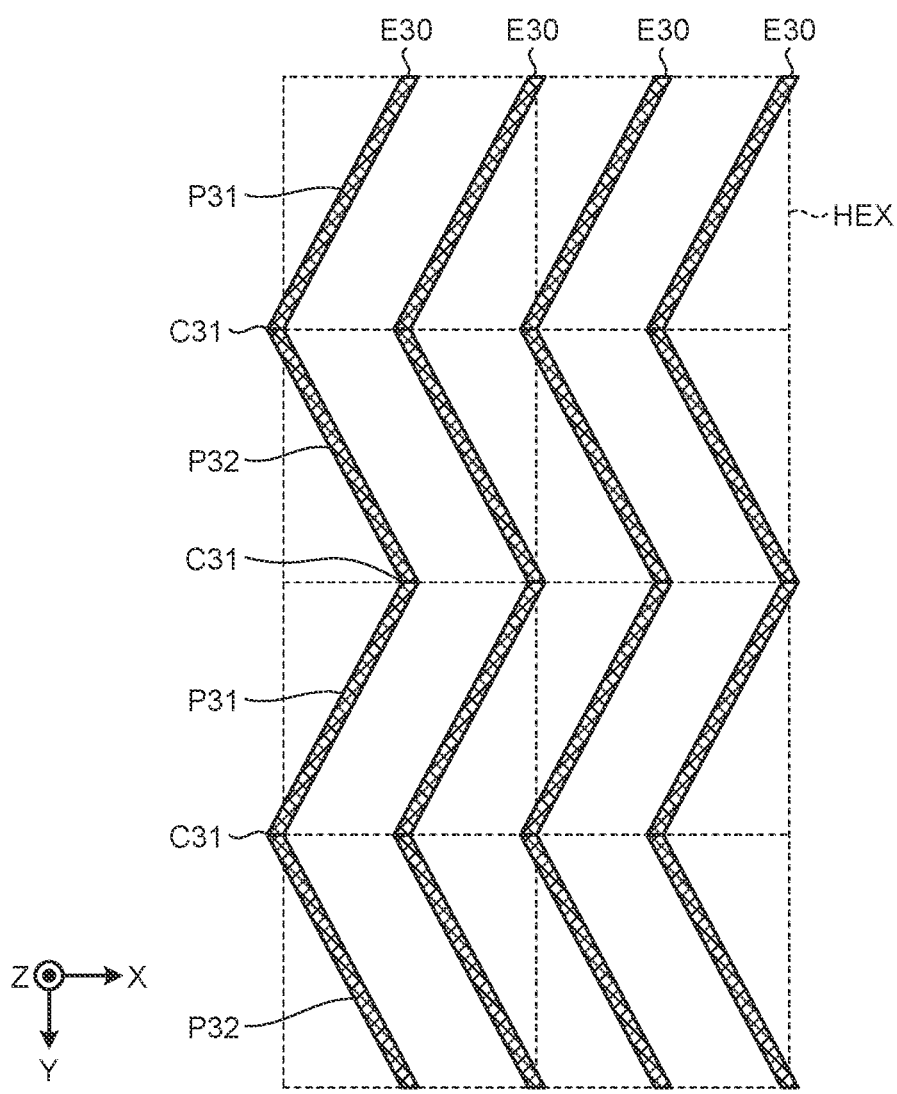
FIG. 15 is a diagram illustrating electrodes in a comparative example.

FIG. 15 is a diagram illustrating electrodes E30 according to a comparative example. The electrode E30 includes an extension part P31 extending in a seventh direction, an extension part P32 extending in an eighth direction, and a coupling part C31 through which the extension part P31 and the extension part P32. The seventh direction is a direction extending along the X-Y plane and intersecting the first direction X and the second direction Y. The eighth direction is a direction extending along the X-Y plane and intersecting the first direction X, the second direction Y, and the seventh direction.

The electrodes E30 are arranged in the X direction. Among the electrodes E30, two electrodes E30 arranged in the X direction are adjacent to each other. The extension parts P31 included in the two respective electrodes E30 arranged in the X direction are adjacent to each other in the X direction. The extension parts P32 included in the two respective electrodes E30 arranged in the X direction are adjacent to each other in the X direction. When the unit region HEX denotes a region including two extension parts P31 or two extension parts P32, a row in which a plurality of the unit regions HEX each including two extension parts P31 are arranged in the X direction and a row in which a plurality of the unit regions HEX each including two extension parts P32 are arranged in the X direction, are alternately arranged in the Y direction.

Figure 16:
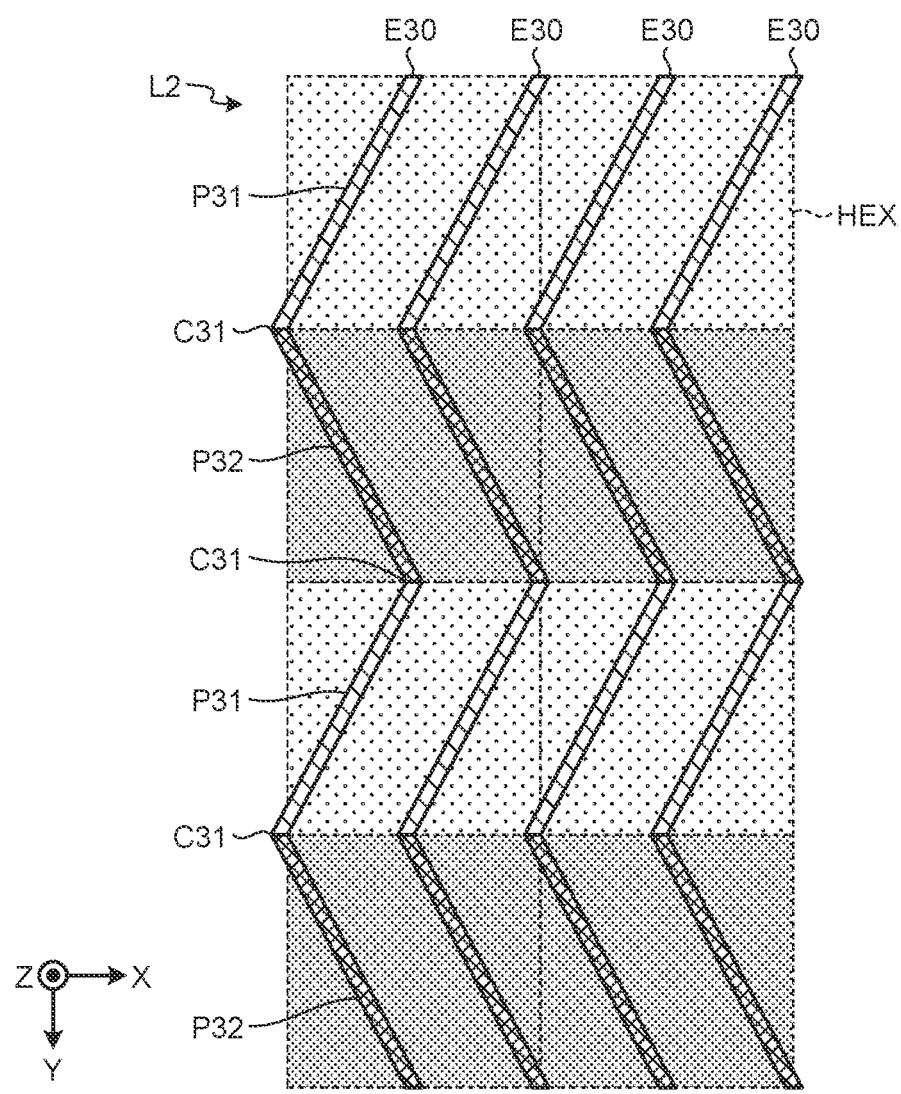
FIG. 16 is a schematic diagram illustrating difference among the amounts of reflected light from unit regions depending on external light.

FIG. 16 is a schematic diagram illustrating difference among the amounts of reflected light from unit regions HEX depending on external light L2. Assuming that, like the external light L2 illustrated in FIG. 16, light is incident on the electrodes E30 as described above with reference to FIG. 15 at an angle with which the amount of visually-recognized light from the extension part P31 is larger than the amount of visually-recognized light from the extension part P32. In this case, the amount of visually-recognized light from a row in which the unit regions HEX each including two extension parts P31 are arranged in the X direction is larger than the amount of visually-recognized light from a row in which the unit regions HEX each including two extension parts P32 are arranged in the X direction. Thus, a stripe pattern of brightness and darkness is visually recognized in the Y direction as illustrated in FIG. 16. If light is incident at an angle with which the amount of visually-recognized light from the extension part P32 is larger than the amount of visually-recognized light from the extension part P31, an inverted stripe pattern of brightness and darkness obtained by inverting the pattern illustrated in FIG. 16 is visually recognized.

In FIG. 16, to schematically illustrate the stripe pattern of brightness and darkness (reflection stripe pattern), a dot pattern provided to the darker unit region HEX is denser than a dot pattern provided to the brighter unit region HEX. FIG. 14 illustrates the dot patterns of the unit regions HEX are uniform in order to indicate that the reflection stripe pattern as schematically illustrated in FIG. 16 is not generated.

As described above with reference to FIGS. 13 to 16, generation of the reflection stripe pattern as illustrated in FIG. 16 can be restrained by disposing the electrode extension parts of the electrodes in a line-symmetric manner such that the amounts of visually-recognized light from the unit regions HEX are substantially equal.

In the first embodiment, each unit region HEX includes one electrode extending in the third direction, one electrode extending in the fourth direction, one electrode extending in the fifth direction, and one electrode extending in the sixth direction. Specifically, in the unit region HEX including the first extension part P1, the second extension part P2, the fifth extension part P5, and the seventh extension part P7, the first extension part P1 extends in the third direction, the second extension part P2 extends in the fourth direction, the fifth extension part P5 extends in the fifth direction, and the seventh extension part P7 extends in the sixth direction. In the unit region HEX including the third extension part P3, the fourth extension part P4, the sixth extension part P6, and the eighth extension part P8, the fourth extension part P4 extends in the third direction, the third extension part P3 extends in the fourth direction, the eighth extension part P8 extends in the fifth direction, and the sixth extension part P6 extends in the sixth direction. Thus, in the first embodiment, from whichever direction external light is incident, the amount of visually-recognized light based on reflected light thereof is substantially equal between the unit regions HEX. Thus, in the first embodiment, the reflection stripe pattern as schematically illustrated in FIG. 16 is not generated.

In the second embodiment, each unit region HEX includes two electrodes extending in the third direction, two electrodes extending in the fourth direction, two electrodes extending in the fifth direction, and two electrodes extending in the sixth direction. Specifically, the first extension part P11 and the fourth extension part P14 extend in the third direction, the second extension part P12 and the third extension part P13 extend in the fourth direction, the fifth extension part P15 and the eighth extension part P18 extend in the fifth direction, and the sixth extension part P16 and the seventh extension part P17 extend in the sixth direction. Thus, in the second embodiment, from whichever direction external light is incident, the amount of visually-recognized light based on reflected light thereof is substantially equal between the unit regions HEX. Thus, in the second embodiment, the reflection stripe pattern as schematically illustrated in FIG. 16 is not generated.

FIG. 17 is a table listing the average value and variance of capacitance of the intersection points CP in each of the first and second embodiments and the comparative example and whether a reflection stripe pattern is generated (visually recognized). A configuration according to the comparative example includes detection electrodes Rx having the shape illustrated in FIG. 15 and drive electrodes Tx having the same shape as the shape illustrated in FIG. 15 and obtained by inverting the relation of the X direction and the Y direction illustrated in FIG. 15. A pixel per inch (ppi) in FIG. 17 indicates the unit of the density of intersection points CP generated in a matrix (row-column configuration). The unit ppi is the number of intersection points CP per square inch (i) when one intersection point CP is regarded as a pixel (p).

As described above with reference to FIGS. 15 and 16, a reflection stripe pattern is generated in the comparative example ("observed"). On the other hand, in the first embodiment and the second embodiment, no reflection stripe pattern is generated as described above ("not observed"). In this manner, the first and second embodiments are more excellent than the comparative example in terms of the quality of appearance depending on whether a reflection stripe pattern is generated.

The average value of capacitance generated at the intersection points CP is in the range of 295 to 314 [ppi] and has almost no significant difference between the first second embodiment, the second embodiments, and the comparative example. However, the degree (range) of variance of capacitance generated at the intersection points CP is significantly smaller in the first and second embodiments than in the comparative example. The smaller the degree (range) of variance of capacitance generated at the intersection points CP, the higher the detection accuracy based on changes in capacitance. Thus, the first and second embodiments are more excellent than the comparative example in terms of the accuracy of detection as well.

The display device 1 according to the first and second embodiments includes drive electrodes Tx each of which is configured to be provided with a drive signal (for example, the drive signal Vs), and detection electrodes Rx opposed to the drive electrodes Tx and configured to generate capacitance between the detection electrodes Rx and the drive electrodes Tx. The drive electrodes Tx include a first electrode (for example, the first electrode E1 or the first electrode E11) and a second electrode (for example, the second electrode E2 or the second electrode E12). The first electrode extends in the first direction X, and the second electrode is disposed at a predetermined interval from the first electrode in the second direction Y intersecting the first direction and is line-symmetric to the first electrode about an axis of symmetry along the first direction X. The first electrode includes a first extension part (for example, the first extension part P1 or the first extension part P11) extending in a third direction, a second extension part (for example, the second extension part P2 or the second extension part P12) extending in a fourth direction, and a first coupling part (for example, the first coupling part C1 or the first coupling part C11) through which the first extension part and the second extension part are coupled to each other. The second electrode includes a third extension part (for example, the third extension part P3 or the third extension part P13) extending in the fourth direction, a fourth extension part (for example, the fourth extension part P4 or the fourth extension part P14) extending in the third direction, and a second coupling part (for example, the second coupling part C2 or the second coupling part C12) through which the third extension part and the fourth extension part are coupled to each other. The detection electrodes include at least a third electrode (for example, the third electrode E3 or the third electrode E13). The third electrode extending in the second direction Y includes a fifth extension part (for example, the fifth extension part P5 or the fifth extension part P15) extending in a fifth direction, a sixth extension part (for example, the sixth extension part P6 or the sixth extension part P16) extending in a sixth direction, and a third coupling part (for example, the third coupling part C3 or the third coupling part C13) through which the fifth extension part and the sixth extension part are coupled to each other. A fourth electrode (for example, the fourth electrode E4 or the fourth electrode E14) line-symmetric to the first electrode about an axis of symmetry along the first direction X is disposed line-symmetric to the third electrode about the second direction Y in the non-contact state. The fourth electrode includes a seventh extension part (for example, the seventh extension part P7 or the seventh extension part P17) extending in the sixth direction, and an eighth extension part (for example, the eighth extension part P8 or the eighth extension part P18) extending in the fifth direction. With this configuration, the reflection angles of light at the extension parts disposed in a line-symmetric arrangement are equalized across the entire fingerprint detection region FA. Thus, it is possible to reduce generation of a stripe pattern, such as the above-described reflection stripe pattern, which would be caused due to unevenness of reflected light strength.

According to the first embodiment, the fourth electrode (fourth electrode E4) is a dummy electrode. The dummy electrode is an electrode that is not coupled to any other conductive part and is in a floating state with unfixed potential. Thus, it is possible to reduce generation of a stripe pattern, such as the above-described reflection stripe pattern, which would be caused due to unevenness of reflected light strength even when the detection electrodes Rx do not have a line-symmetric structure.

According to the first embodiment, the position of the dummy electrode is identical to the position of the drive electrode Tx in a direction in which the drive electrode Tx and the detection electrode Rx are opposed to each other. With this configuration, it is not necessary to provide an electrode layer dedicated for the dummy electrode, and it is possible to reduce generation of a stripe pattern at lower cost.

According to the second embodiment, the fourth electrode (fourth electrode E14) is included in the detection electrodes Rx. With this configuration, it is possible to reduce generation of a stripe pattern, such as the above-described reflection stripe pattern, which would be caused due to unevenness of reflected light strength.

The first electrode E21 and the second electrode E22 described above with reference to FIG. 13 may be set as the detection electrodes Rx, and the drive electrodes Tx having a rectangular shape in a longitudinal direction along the X direction may be arranged in the Y direction. Alternatively, the drive electrodes TX may be electrodes having configurations obtained by inverting the relation of the X direction and the Y direction of the first electrode E21 and the second electrode E22 described above with reference to FIG. 13 with respect to the first direction X and the second direction Y and may be set as the drive electrodes Tx; and the detection electrodes Rx having a rectangular shape in a longitudinal direction along the Y direction may be arranged in the X direction. Specifically, the detection device may include drive electrodes Tx each of which is configured to be provided with a drive signal, and detection electrodes Rx opposed to the drive electrodes Tx and configured to generate capacitance between the detection electrodes Rx and the drive electrodes Tx. The drive electrodes Tx or the detection electrodes Rx may include a first electrode (for example, the first electrode E21) extending in a predetermined direction (for example, the first direction X or the second direction Y), and a second electrode (for example, the second electrode E22) that is disposed at a predetermined interval from the first electrode in a direction intersecting the predetermined direction and is line-symmetric to the first electrode about an axis of symmetry along the predetermined direction. In this case, the first electrode includes a first extension part (for example, the first extension part P21) extending in a third direction, a second extension part (for example, the second extension part P22) extending in a fourth direction, and a first coupling part (for example, the first coupling part C21) through which the first extension part and the second extension part are coupled to each other. The second electrode includes a third extension part (for example, the third extension part P23) extending in the fourth direction, a fourth extension part (for example, the fourth extension part P24) extending in the third direction, and a second coupling part (for example, the second coupling part C22) through which the third extension part and the fourth extension part are coupled to each other. With this configuration as well, it is possible to reduce generation of a stripe pattern, such as the above-described reflection stripe pattern, which would be caused due to unevenness of reflected light strength.

Modifications

The following describes modifications of electrode extension parts with reference to FIGS. 18 to 22.

First Modification

Figure 18:
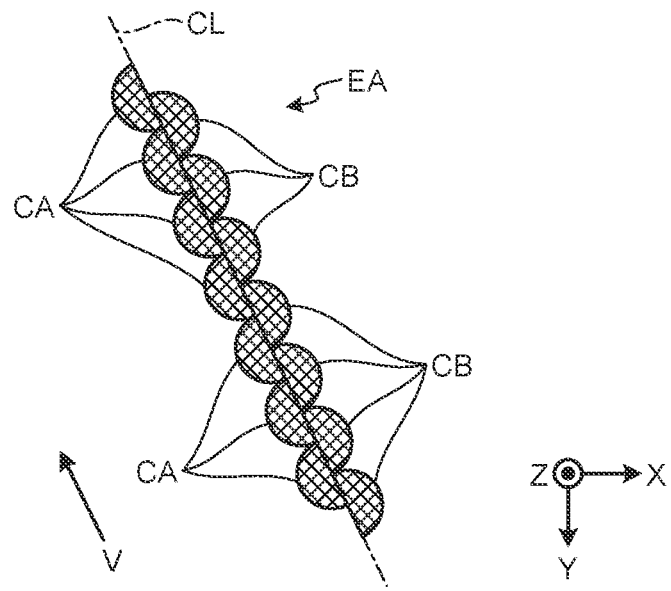
FIG. 18 is a diagram illustrating an exemplary modification (first modification) of electrode extension parts.

FIG. 18 is a diagram illustrating an exemplary modification (first modification) of electrode extension parts. A direction indicated by an arrow V and the extension direction of a reference line CL in FIG. 18 and FIG. 19 to be described later are each the third direction, the fourth direction, the fifth direction, or the sixth direction described above.

An electrode extension part extending in the extension direction of the reference line CL may include a plurality of curved parts that are continuous along the reference line CL as illustrated in FIG. 18. Specifically, an extension part EA in FIG. 18 includes semicircular curved parts CA provided on one side of the reference line CL, and semicircular curved parts CB provided on a side opposite to the curved part CA with respect to the reference line CL. The curved parts CA and the curved parts CB are disposed in a staggered manner along the reference line CL. The curved parts CA are not separated from the curved parts CB at the reference line CL but are physically and electrically continuous. In this manner, such curved parts CA and curved parts CB are disposed continuous along the reference line CL, so that the entire extension part EA extends along the reference line CL.

The first extension part P1, the second extension part P2, the third extension part P3, the fourth extension part P4, the fifth extension part P5, the sixth extension part P6, the seventh extension part P7 (the first piece P71 and the second piece P72), the eighth extension part P8 (the first piece P81 and the second piece P82), the first extension part P11, the second extension part P12, the third extension part P13, the fourth extension part P14, the fifth extension part P15, the sixth extension part P16, the seventh extension part P17, the eighth extension part P18, the first extension part P21, the second extension part P22, the third extension part P23, and the fourth extension part P24 described above each have a straight shape in the extension direction of the extension part but may each have a shape including a plurality of curved parts in the extension direction like the extension part EA.

Second Modification

Figure 19:
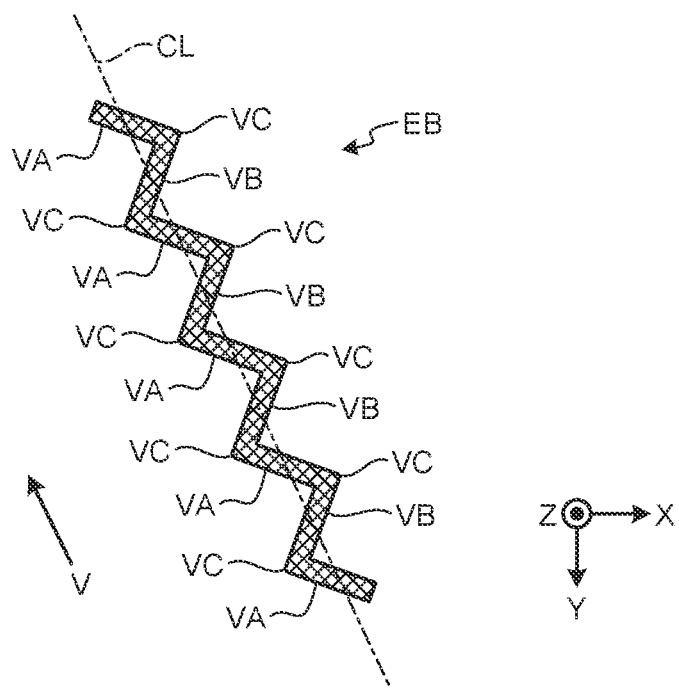
FIG. 19 is a diagram illustrating another exemplary modification (second modification) of electrode extension parts.

FIG. 19 is a diagram illustrating another exemplary modification (second modification) of electrode extension parts. An electrode extension part extending in the extension direction of the reference line CL may include a plurality of bent parts that are continuous along the reference line CL as illustrated in FIG. 19. Specifically, an extension part EB includes a plurality of first pieces VA, a plurality of second pieces VB, and a plurality of corners VC. Each first piece VA is provided along a direction so as to intersect the reference line CL and extends from one side of the reference line CL toward the other side of the reference line CL so as to pass over the reference line CL. Each second piece VB is provided so as to intersect the reference line CL at an angle different from that of the first piece VA and extends from the one side of the reference line CL toward the other side of the reference line CL so as to pass over the reference line CL. Each corner VC is a bent part provided to couple the first piece VA and the second piece VB that are adjacent. The first pieces VA and the second pieces VB are disposed in a staggered manner along the reference line CL. The first pieces VA, the second pieces VB, and the corners VC are physically and electrically continuous. Thus, the entire extension part EB including the first pieces VA, the second pieces VB, and the bent parts VC extends along the reference line CL.

The first extension part P1, the second extension part P2, the third extension part P3, the fourth extension part P4, the fifth extension part P5, the sixth extension part P6, the seventh extension part P7 (the first piece P71 and the second piece P72), the eighth extension part P8 (the first piece P81 and the second piece P82), the first extension part P11, the second extension part P12, the third extension part P13, the fourth extension part P14, the fifth extension part P15, the sixth extension part P16, the seventh extension part P17, the eighth extension part P18, the first extension part P21, the second extension part P22, the third extension part P23, and the fourth extension part P24 described above each have a straight shape in the extension direction of the extension part but may each have a shape including a plurality of bent parts in the extension direction like the extension part EB.

Third Modification

Figure 20:
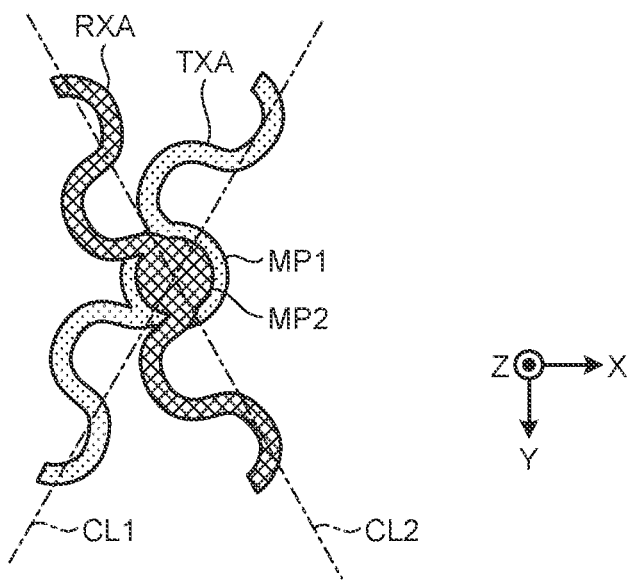
FIG. 20 is a diagram illustrating another exemplary modification (third modification) of electrode extension parts.
Figure 21:
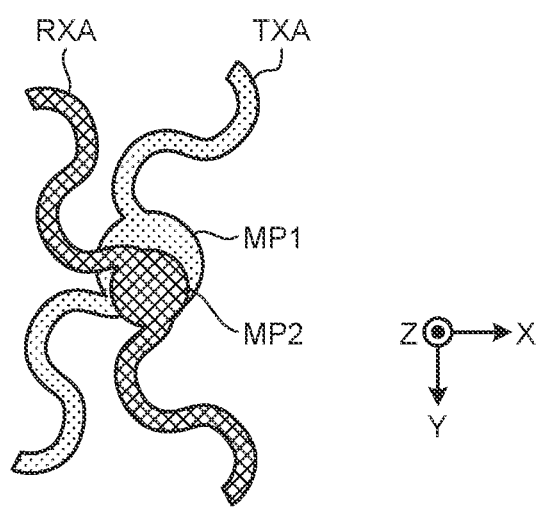
FIG. 21 is a diagram illustrating the other exemplary modification (third modification) of electrode extension parts.

FIGS. 20 and 21 are diagrams illustrating another exemplary modification (third modification) of electrode extension parts. A reference line CL1 illustrated in FIGS. 20 and 21 extends in the third direction or the fourth direction. A reference line CL2 illustrated in FIGS. 20 and 21 extends in the fifth direction or the sixth direction.

A drive electrode Tx includes a curved part TXA and a joint part MP1. A detection electrode Rx includes a curved part RXA and a joint part MP2. The curved part TXA is made up of a plurality of arcs that are continuous along the reference line CL1. The curved part RXA is made up of a plurality of arcs that are continuous along the reference line CL2. The arcs of the curved parts TXA and RXA are substantially equivalent to the semicircular curved parts CA and CB, which are continuous in the extension part EA described above with reference to FIG. 18, when the semicircular shapes thereof are replaced with arc shapes.

The joint part MP1 is a large-area part of the electrode provided at an intersection point CP where the drive electrode Tx and the detection electrode Rx overlap in the X-Y plan view. In the example illustrated in FIGS. 20 and 21, the diameter of the joint part MP2 is less than the diameter of the joint part MP1, but the diameter of the joint part MP2 may be greater than or equal to the diameter of the joint part MP1. The shapes of the joint parts MP1 and MP2 are not limited to circular shapes but may be any other shapes. The joint parts MP1 and MP2 only need to be provided so that the overlapping area of the joint parts MP1 and MP2 in the X-Y plan view is likely to be larger, which means that the joint parts MP1 and MP2 only need to be provided in such shapes that "the overlapping area is likely to be larger" than the overlapping area of the curved parts TXA and RXA when overlapping in the X-Y plan view.

The drive electrode Tx and the detection electrode Rx are desirably disposed in a positional relation that the joint part MP2 is positioned inside the joint part MP1 in the X-Y plan view as illustrated in, for example, FIG. 20. When manufacturing error or the like occurs, the drive electrode Tx and the detection electrode Rx may be disposed such that part of the joint part MP2 is positioned outside the joint part MP1 in the X-Y plan view as illustrated in, for example, FIG. 21.

Even if that is the case, since the joint parts MP1 and MP2 are provided so that "the overlapping area thereof is likely to be larger" than that of the curved parts TXA and RXA, it is likely to reduce influence of decrease of the overlapping area due to such error or the like. In other words, even when the drive electrode Tx and the detection electrode Rx are disposed such that part of the joint part MP2 is positioned outside the joint part MP1 as illustrated in FIG. 21, it is possible to achieve sufficient performance in the accuracy of touch detection (fingerprint detection) based on capacitance between the drive electrode Tx and the detection electrode Rx.

Exemplary Application of Modification

Figure 22:
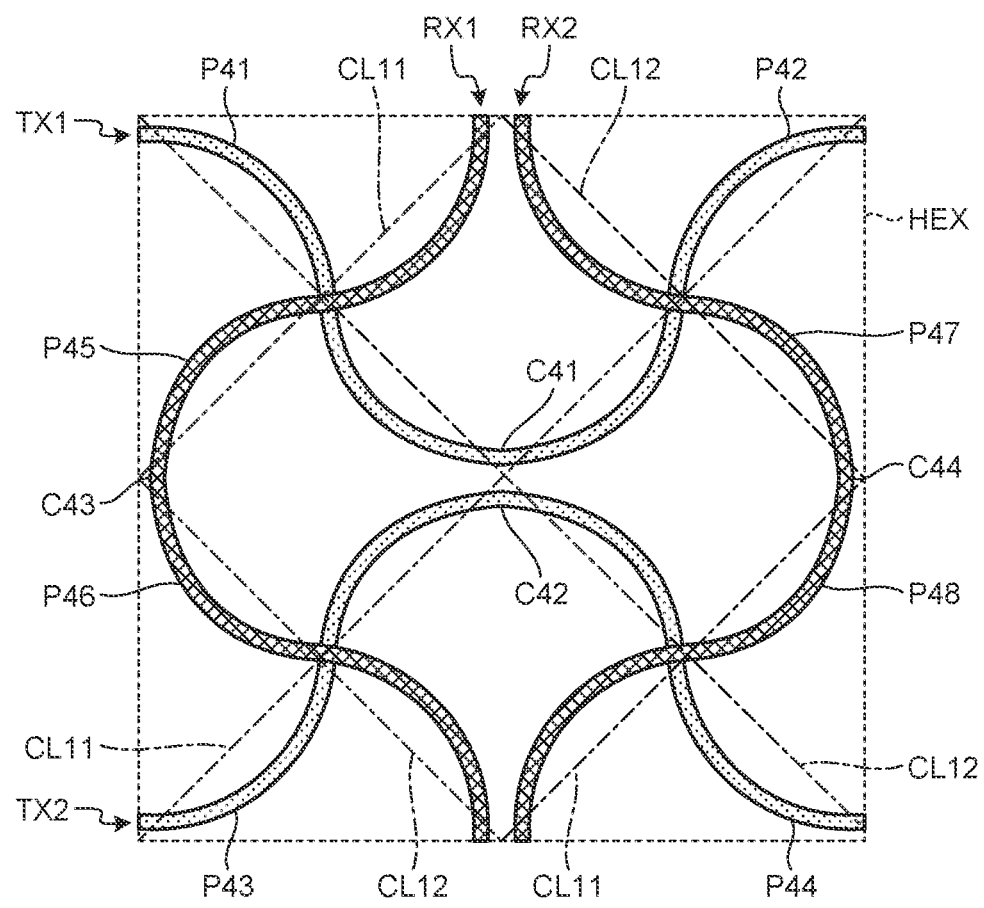
FIG. 22 is a diagram illustrating the X-Y plane shapes of drive electrodes and detection electrodes and an and the detection electrodes in an exemplary application of a modification.
Figure 22:
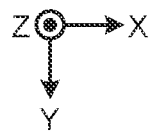

FIG. 22 is a diagram illustrating the X-Y plane shapes of drive electrodes Tx and detection electrodes Rx and an Tx and the detection electrodes Rx in an exemplary application of a modification.

The drive electrodes Tx include a first electrode TX1 and a second electrode TX2 disposed line-symmetric about the first direction X in a non-contact positional relation.

The first electrode TX1 includes a first extension part P41 extending in a third direction, a second extension part P42 extending in a fourth direction, and a first coupling part C41 through which the first extension part P41 and the second extension part P42 are coupled to each other.

The second electrode TX2 includes a third extension part P43 extending in the fourth direction, a fourth extension part P44 extending in the third direction, a second coupling part C42 through which the third extension part P43 and the fourth extension part P44 are coupled to each other.

The third direction is a direction extending along the X-Y plane and intersecting the first direction X and the second direction Y. The fourth direction is a direction extending along the X-Y plane and intersecting the first direction X, the second direction Y, and the third direction. The third direction may be identical to or different from the third direction in at least one of the first and second embodiments. The fourth direction may be identical to or different from the fourth direction in at least one of the first and second embodiments.

In the example illustrated in FIG. 22, the third direction is a direction along a reference line CL12. The fourth direction is a direction along a reference line CL11. The first extension part P41 and the fourth extension part P44 are each made up of continuous parts: one of the parts being arc-shaped on one side of the reference line CL12, the other part being arc-shaped on the other side of the reference line CL12. The reference line CL12 is illustrated as a diagonal line connecting two opposed apexes among the four apexes of the unit region HEX. The second extension part P42 and the third extension part P43 are each made up of continuous parts: one of the parts being arc-shaped on one side of the reference line CL11, the other part being arc-shaped on the other side of the reference line CL11. The reference line CL11 is illustrated as a diagonal line connecting the other two opposed apexes among the four apexes of the unit region HEX.

The first electrode Tx' is one electrode in which the first extension part P41 and the second extension part P42 are continuous through the first coupling part C41. The second electrode Tx2 is one electrode in which the third extension part P43 and the fourth extension part P44 are continuous through the second coupling part C42. These electrodes are continuous as a whole in the first direction X.

The detection electrodes Rx illustrated in FIG. 22 include a third electrode RX1 and a fourth electrode RX2 disposed line-symmetric about the second direction Y in a non-contact positional relation.

The third electrode RX1 includes a fifth extension part P45 extending in the fifth direction, a sixth extension part P46 extending in the sixth direction, and a third coupling part C43 through which the fifth extension part P45 and the sixth extension part P46 are coupled to each other.

The third electrode RX2 includes a seventh extension part P47 extending in the sixth direction, an eighth extension part P48 extending in the fifth direction, and a fourth coupling part C44 through which the seventh extension part P47 and the eighth extension part P48 are coupled to each other.

The fifth direction is a direction extending along the X-Y plane and intersecting the first direction X and the second direction Y. The sixth direction is a direction extending along the X-Y plane and intersecting the first direction X, the second direction Y, and the fifth direction. The fifth direction may be parallel to the third direction. The sixth direction may be parallel to the fourth direction. The fifth direction may be identical to or different from the fifth direction in at least one of the first and second embodiments. The sixth direction may be identical to or different from the sixth direction in at least one of the first and second embodiments.

In the example illustrated in FIG. 17, the fifth direction is a direction along the reference line CL11. The sixth direction is a direction along the reference line CL12. The sixth extension part P46 is made up of continuous parts: one of the parts being arc-shaped on one side of one of two opposed straight reference lines CL12, and the other part being arc-shaped on the other side of the one of the two opposed straight reference lines CL12. The two opposed straight reference lines CL12 are positioned facing each other with the reference line CL12 interposed therebetween and are parallel to the reference line CL12. As described above, the reference line CL12 is a diagonal line connecting two opposed apexes (first two opposed apexes) among the four apexes of the unit region HEX. The seventh extension part P47 is made up of continuous parts: one of the parts being arc-shaped on one side of the other of the two opposed straight reference lines CL12, the other part being arc-shaped on the other side of the other of the two opposed straight reference lines CL12. The fifth extension part P45 is made up of continuous parts: one of the parts being arc-shaped on one side of one of two opposed straight reference line CL11, the other part being arc-shaped on the other side of the one of the two opposed straight reference line CL11. The two opposed straight reference line CL11 are positioned facing each other with the reference line CL11 interposed therebetween and are parallel to the reference line CL11. As described above, the reference line CL11 is a diagonal line connecting the other two opposed apexes (second two opposed apexes) among the four apexes of the unit region HEX. The eighth extension part P48 is made up of continuous parts: one of the parts being arc-shaped on one side of the other of the two opposed straight reference line CL11, the other part being arc-shaped on the other side of the other of the two opposed straight reference line CL11.

The third electrode RX1 is one electrode in which the fifth extension part P45 and the sixth extension part P46 are continuous through the third coupling part C43. The fourth electrode RX2 is one electrode in which the seventh extension part P47 and the eighth extension part P48 are continuous through the fourth coupling part C44. These electrodes are continuous as a whole in the second direction Y.

FIG. 22 illustrates one unit region HEX, but in reality, a plurality of the unit regions HEX are arranged in a matrix (row-column configuration) as described above with reference to FIG. 11.

In one unit region HEX, the first extension part P41 and the second extension part P42 extend in a manner line-symmetric about a Y-directional straight line passing over the first coupling part C41. In one unit region HEX, the third extension part P43 and the fourth extension part P44 extend in a manner line-symmetric about a Y-directional straight line passing over the second coupling part C42. In one unit region HEX, the fifth extension part P45 and the sixth extension part P46 extend in a manner line-symmetric about an X-directional straight line passing over the third coupling part C43. In one unit region HEX, the seventh extension part P47 and the eighth extension part P48 extend in a manner line-symmetric about an X-directional straight line passing over the fourth coupling part C44.

Although not illustrated, the first extension part P41 and the second extension part P42 that are opposed to each other and interpose the boundary line between two unit regions HEX adjacent in the X direction, extend in a manner line-symmetric about the boundary line. The third extension part P43 and the fourth extension part P44 that are opposed to each other and interpose the boundary line between two unit regions HEX adjacent in the X direction, extend in a manner line-symmetric about the boundary line. The fifth extension part P45 and the sixth extension part P46 that are opposed to each other and interpose the boundary line between two unit regions HEX adjacent in the Y direction, extend in a manner line-symmetric about the boundary line. The seventh extension part P47 and the eighth extension part P48 that are opposed to each other and interpose the boundary line between two unit regions HEX adjacent in the Y direction, extend in a manner line-symmetric about the boundary line.

According to the modifications, each extension part includes a plurality of bent parts that are continuous in the extension direction of the extension part or a plurality of curved parts that are continuous in the extension direction thereof. Thus, it is possible to reduce generation of a straight structure at each extension part, thereby reducing generation of a linear reflected light band (bright line band) that is likely to be generated due to the straight structure. Consequently, it is possible to reduce generation of a stripe pattern, such as the above-described reflection stripe pattern, which would be caused due to unevenness of reflected light strength.

According to the third modification, the drive electrode Tx includes a first opposed part (for example, the joint part MP1) provided at a position opposed to the detection electrode Rx. The detection electrode Rx includes a second opposed part (for example, the joint part MP2) provided at a position opposed to the first opposed part. At least one of the first opposed part and the second opposed part has a thickness greater than that of the other portions of the drive electrode Tx and the detection electrode Rx in a direction orthogonal to the extension direction. Thus, the accuracy of touch detection (fingerprint detection) is more likely to be ensured.

Third Embodiment and Modifications

Figure 23:
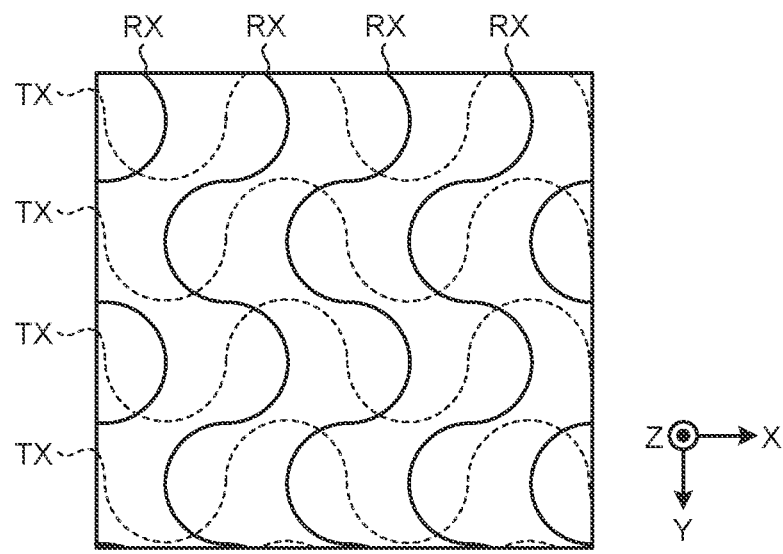
FIG. 23 is a diagram illustrating the X-Y plane shapes of drive electrodes and detection electrodes and an exemplary positional relation between the drive electrodes and the detection electrodes in a third embodiment.
Figure 24:
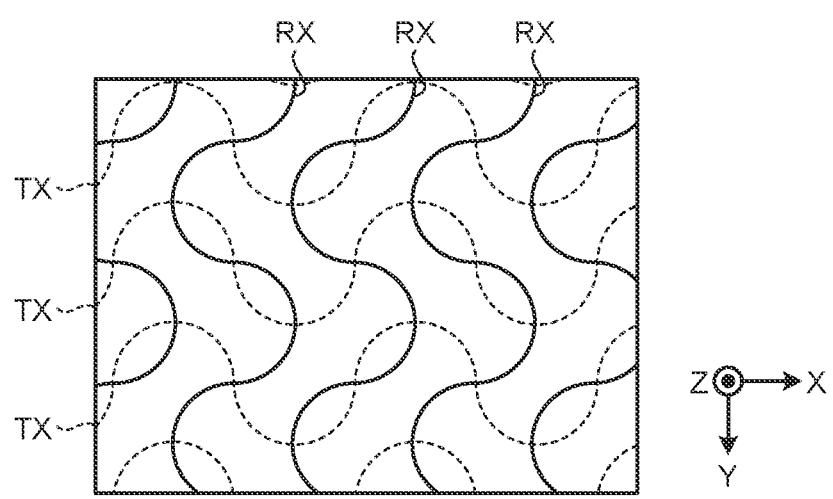
FIG. 24 is a diagram illustrating the X-Y plane shapes of drive electrodes and detection electrodes and an exemplary positional relation between the drive electrodes and the detection electrodes in a modification of the third embodiment.
Figure 25:
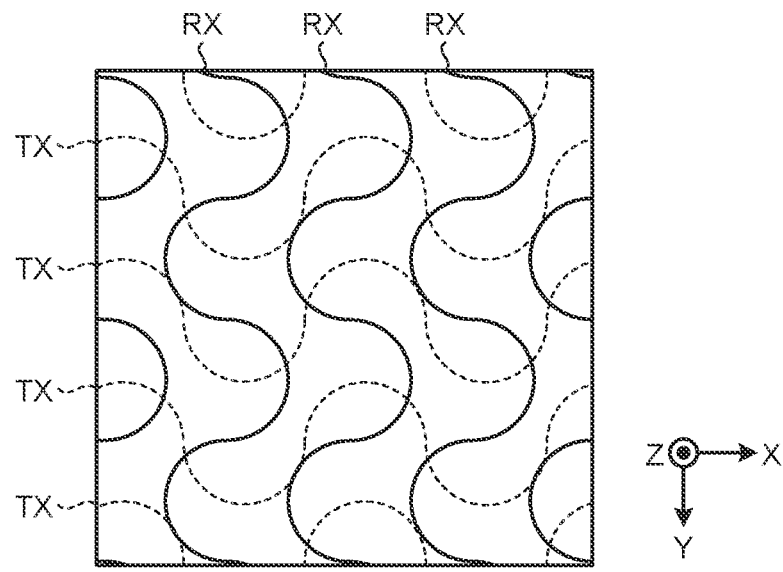
FIG. 25 is a diagram illustrating the X-Y plane shapes of drive electrodes and detection electrodes and an exemplary positional relation between the drive electrodes and the detection electrodes in the modification of the third embodiment.
Figure 26:
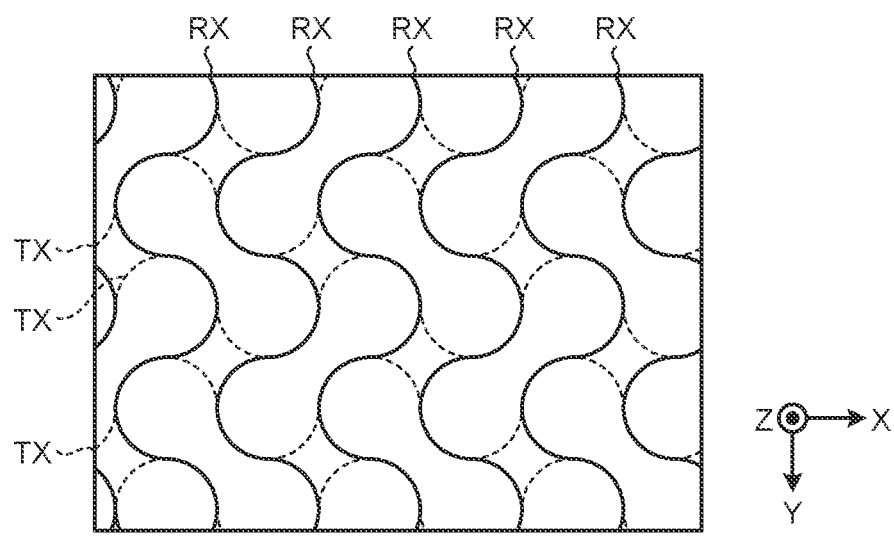
FIG. 26 is a diagram illustrating the X-Y plane shapes of drive electrodes and detection electrodes and an exemplary positional relation between the drive electrodes and the detection electrodes in the modification of the third embodiment.
Figure 27:
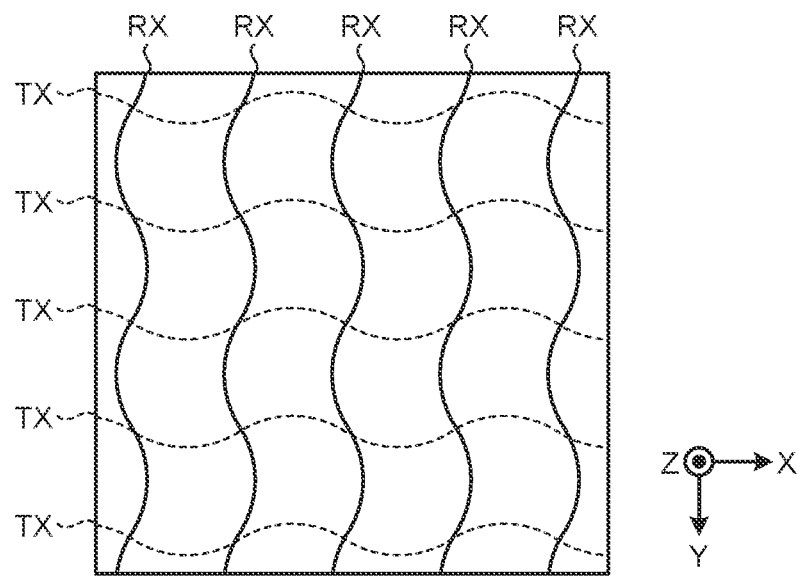
FIG. 27 is a diagram illustrating the X-Y plane shapes of drive electrodes and detection electrodes and an and the detection electrodes in the modification of the third embodiment.
Figure 28:
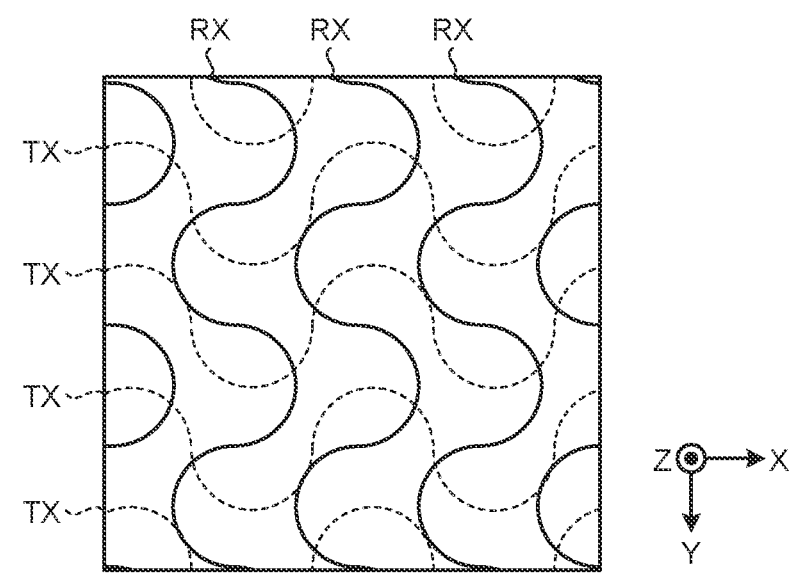
FIG. 28 is a diagram illustrating the X-Y plane shapes of drive electrodes and detection electrodes and an exemplary positional relation between the drive electrodes and the detection electrodes in the modification of the third embodiment.
Figure 29:
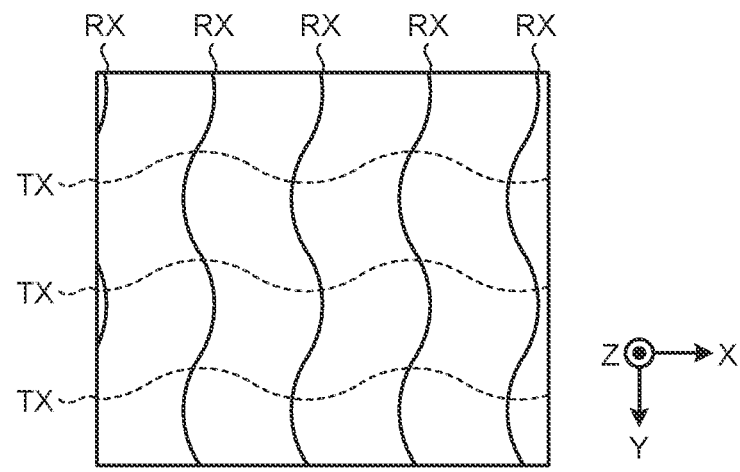
FIG. 29 is a diagram illustrating the X-Y plane shapes of drive electrodes and detection electrodes and an exemplary positional relation between the drive electrodes and the detection electrodes in the modification of the third embodiment.
Figure 30:
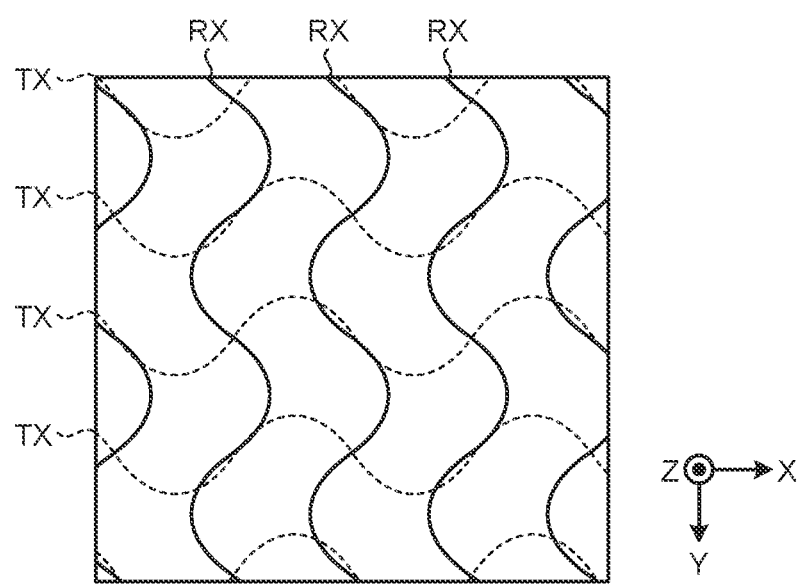
FIG. 30 is a diagram illustrating the X-Y plane shapes of drive electrodes and detection electrodes and an exemplary positional relation between the drive electrodes and the detection electrodes in the modification of the third embodiment.
Figure 31:
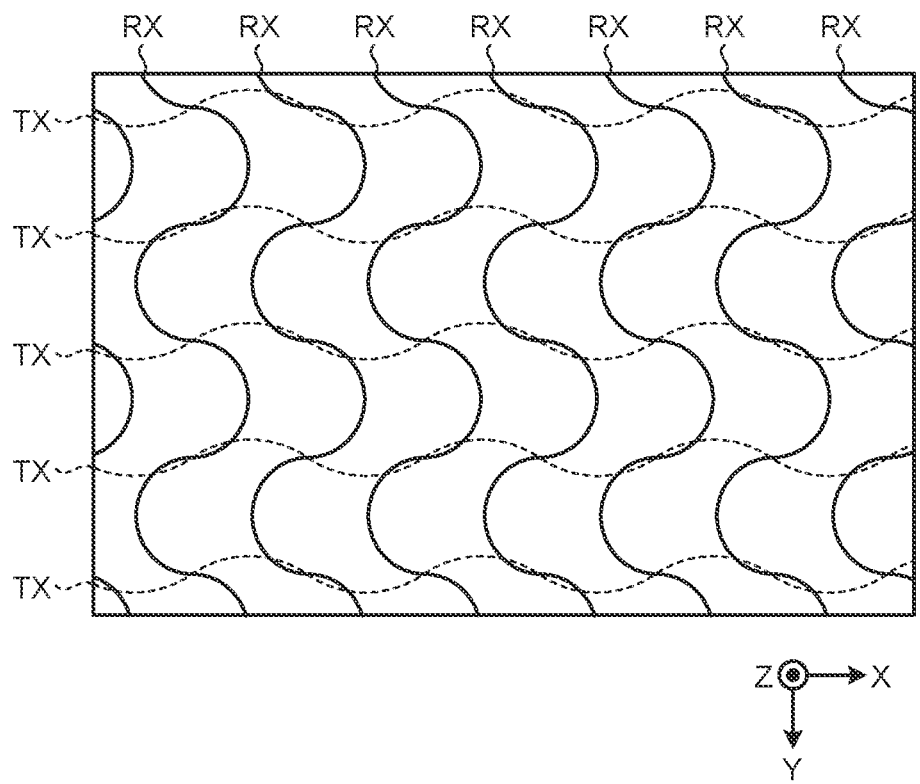
FIG. 31 is a diagram illustrating the X-Y plane shapes of drive electrodes and detection electrodes and an exemplary positional relation between the drive electrodes and the detection electrodes in the modification of the third embodiment.

FIG. 23 is a diagram illustrating the X-Y plane shapes of drive electrodes Tx and detection electrodes Rx in the third embodiment and an exemplary positional relation between the drive electrodes Tx and the detection electrodes Rx. FIGS. 24, 25, 26, 27, 28, 29, 30, and 31 are diagrams each illustrating the X-Y plane shapes of the drive electrodes Tx and the detection electrodes Rx and an exemplary positional relation between the drive electrodes Tx and the detection electrodes Rx in modifications of the third embodiment.

Each drive electrode Tx illustrated in FIGS. 23 to 31 extends in the first direction and includes a plurality of curved parts that are continuous in the extension direction. The drive electrodes Tx are arranged at equal intervals in the second direction Y intersecting the first direction X.

The description "arranged at equal intervals in the second direction Y" means that the "distance in the second direction Y" between two adjacent drive electrodes Tx is constant in all pairs of "two drive electrodes Tx". When the shortest distance between parts of two adjacent drive electrodes Tx has a direction intersecting the second direction Y, such a shortest distance is not considered but only the "distance in the second direction Y" is concerned in the description.

Each detection electrode Rx illustrated in FIGS. 23 to 31 extends in the second direction Y and includes a plurality of curved parts that are continuous in the extension direction. The detection electrodes Rx are arranged at equal intervals in the first direction X.

The description "arranged at equal intervals in the first direction X" means that the "distance in the first direction X" between two adjacent detection electrodes Rx is constant in all pairs of "two detection electrodes Rx". When the shortest distance between parts of two adjacent detection electrodes Rx has a direction intersecting the first direction X, such a shortest distance is not considered but only the "distance in the first direction X" is concerned in the description.

According to the third embodiment and the modifications thereof, the display device 1 includes a plurality of drive electrodes Tx each of which is provided with a drive signal, and a plurality of detection electrodes Rx opposed to the drive electrodes Tx and configured to generate capacitance between the detection electrodes Rx and the drive electrodes Tx. Each drive electrode Tx extends in the first direction X and includes a plurality of curved parts that are continuous in the extension direction. The drive electrodes Tx are arranged at equal intervals in the second direction Y intersecting the first direction X. Each detection electrode Rx extends in the second direction Y and includes a plurality of curved parts that are continuous in the extension direction. The detection electrodes Rx are arranged at equal intervals in the first direction X. Thus, it is possible to reduce generation of a straight structure at each extension part, thereby reducing generation of a linear reflected light band (bright line band) that is likely to be generated due to the straight structure. Consequently, it is possible to reduce generation of a stripe pattern, such as the above-described reflection stripe pattern, which would be caused due to unevenness of reflected light strength.

Any component related to image display among the components included in the display device 1 may be omitted. In this case, the display panel 30 may be omitted.

It should be understood that, among other effects achieved by the aspects described above, those clear from description of the present specification or those that could be thought of by the skilled person in the art as appropriate are achieved by the present invention.

What is claimed is:
1. A detection device comprising:
   drive electrodes each of which is configured to be provided with a drive signal;
   detection electrodes opposed to the drive electrodes and configured to generate capacitance between the detection electrodes and the drive electrodes; and dummy electrodes in a floating state,
wherein the drive electrodes include
   a first electrode extending in a first direction, and
   a second electrode disposed at a predetermined interval from the first electrode in a second direction intersecting the first direction,
wherein the detection electrodes include a third electrode extending in the second direction,
wherein the dummy electrodes include a fourth electrode disposed at a predetermined interval from the third electrode in the first direction,
wherein the first electrode includes
   a first extension part extending in a third direction different from the first direction,
   a second extension part extending in a fourth direction different from the first direction and the third direction, and
   a first coupling part through which the first extension part and the second extension part are coupled to each other,
wherein the second electrode includes
   a third extension part extending in the fourth direction,
   a fourth extension part extending in the third direction, and
   a second coupling part through which the third extension part and the fourth extension part are coupled to each other,
wherein the first extension part and the third extension part are arranged in the second direction and opposed to each other,
wherein the second extension part and the fourth extension part are arranged in the second direction and opposed to each other,
wherein the third electrode includes
   a fifth extension part extending in a fifth direction different from the second direction,
   a sixth extension part extending in a sixth direction different from the second direction and the fifth direction, and
   a third coupling part through which the fifth extension part and the sixth extension part are coupled to each other,
wherein the fourth electrode includes
   a seventh extension part extending in the sixth direction, and
   an eighth extension part extending in the fifth direction,
wherein the fifth extension part and the seventh extension part are arranged in the first direction and opposed to each other, and
wherein the sixth extension part and the seventh extension part are arranged in the first direction and opposed to each other.

2. The detection device according to claim 1,
wherein the first electrode and the second electrode are line-symmetric to each other about an axis of symmetry along the first direction, and
wherein the third electrode and the fourth electrode are line-symmetric to each other about an axis of symmetry along the second direction.

3. The detection device according to claim 1,
wherein a position of each of the dummy electrodes is identical to a position of each of the drive electrodes in a direction in which the drive electrodes and the detection electrodes are opposed to each other.

4. The detection device according to claim 1,
wherein each of the first extension part, the second extension part, the third extension part, the fourth extension part, the fifth extension part, the sixth extension part, the seventh extension part, and the eighth extension part includes bent parts that are continuous in an extension direction of the extension part or curved parts that are continuous in the extension direction.

5. The detection device according to claim 4,
wherein each of the drive electrodes includes a first opposed part provided at a position opposed to a corresponding one of the detection electrodes,
wherein each of the detection electrode includes a second opposed part provided at a position opposed to the first opposed part, and
wherein at least one of the first opposed part or the second opposed part has a thickness greater than the thickness of the other portions of the drive electrode and the detection electrode in a direction orthogonal to the extension direction.

6. A touch-detection display device comprising:
a display configured to display an image; and
a detector including drive electrodes and detection electrodes,
wherein each drive electrode and each detection electrode are the drive electrode and the detection electrode, respectively, according to claim 1.

7. A detection device comprising:
drive electrodes each of which is configured to be provided with a drive signal;
detection electrodes opposed to the drive electrodes; and
dummy electrodes which are coupled to neither the drive electrodes nor the detection electrodes,
wherein the drive electrodes include
   a first electrode extending in a first direction, and
   a second electrode disposed at a predetermined interval from the first electrode in a second direction intersecting the first direction,
wherein the detection electrodes include a third electrode extending in the second direction,
wherein the dummy electrodes include a fourth electrode disposed at a predetermined interval from the third electrode in the first direction,
wherein the first electrode includes
   a first extension part extending in a third direction different from the first direction,
   a second extension part extending in a fourth direction different from the first direction and the third direction, and
   a first coupling part through which the first extension part and the second extension part are coupled to each other,
wherein the second electrode includes
   a third extension part extending in the fourth direction,
   a fourth extension part extending in the third direction, and
   a second coupling part through which the third extension part and the fourth extension part are coupled to each other,
wherein the first extension part and the third extension part are arranged in the second direction and opposed to each other, and
wherein the second extension part and the fourth extension part are arranged in the second direction and opposed to each other.

8. The detection device according to claim 7,
wherein the third electrode includes
   a fifth extension part extending in a fifth direction different from the second direction, a sixth extension part extending in a sixth direction different from the second direction and the fifth direction, and a third coupling part through which the fifth extension part and the sixth extension part are coupled to each other.

9. The detection device according to claim 8, wherein the fourth electrode includes a seventh extension part extending in the sixth direction, and an eighth extension part extending in the fifth direction, wherein the fifth extension part and the seventh extension part are arranged in the first direction and opposed to each other, and wherein the sixth extension part and the seventh extension part are arranged in the first direction and opposed to each other.

10. The detection device according to claim 9, wherein each of the first to eighth extension parts includes bent parts or curved parts.

11. The detection device according to claim 7, wherein the fourth electrode includes a seventh extension part extending in the sixth direction, and an eighth extension part extending in the fifth direction, wherein a first part of the third electrode and the seventh extension part are arranged in the first direction and opposed to each other, and wherein a second part of the third electrode and the seventh extension part are arranged in the first direction and opposed to each other, the first part being different from the second part.

12. The detection device according to claim 7, wherein each of the first to fourth extension parts includes bent parts or curved parts.

13. The detection device according to claim 7, wherein the dummy electrodes are in a floating state.

14. The detection device according to claim 7, wherein the dummy electrodes and the drive electrodes are disposed in a same layer.

15. The detection device according to claim 7, wherein the first electrode and the second electrode are line-symmetric to each other about an axis of symmetry along the first direction.

16. The detection device according to claim 15, wherein the third electrode and the fourth electrode are line-symmetric to each other about an axis of symmetry along the second direction.

17. The detection device according to claim 7, wherein the third electrode and the fourth electrode are line-symmetric to each other about an axis of symmetry along the second direction.

18. The detection device according to claim 7, wherein each of the drive electrodes includes a first opposed part provided at a position opposed to a corresponding one of the detection electrodes and a first linear part extending from the first opposed part, wherein the first opposed part has a first width in a direction toward the corresponding one of the detection electrodes, wherein the first linear part has a second width in a direction orthogonal to a longitudinal of the first linear part, and wherein the first width is wider than the second width.

19. The detection device according to claim 18, wherein each of the detection electrodes includes a second opposed part provided at a position opposed to a corresponding one of the drive electrodes and a second linear part extending from the second opposed part, wherein the second opposed part has a third width in a direction toward the corresponding one of the drive electrodes, wherein the second linear part has a fourth width in a direction orthogonal to a longitudinal of the second linear part, and wherein the third width is wider than the fourth width.

20. The detection device according to claim 7, wherein each of the detection electrodes includes a second opposed part provided at a position opposed to a corresponding one of the drive electrodes and a second linear part extending from the second opposed part, wherein the second opposed part has a third width in a direction toward the corresponding one of the drive electrodes, wherein the second linear part has a fourth width in a direction orthogonal to a longitudinal of the second linear part, and wherein the third width is wider than the fourth width.

* * * * *